US011449215B2

(12) United States Patent  (10) Patent No.: US 11,449,215 B2
Kim  (45) Date of Patent: Sep. 20, 2022

(54) TOUCH INPUT DEVICE HAVING RESIZEABLE ICONS, AND METHODS OF USING SAME

(71) Applicant: HiDeep, Inc., Seongnam-si (KR)

(72) Inventor: Seyeob Kim, Seongnam-si (KR)

(73) Assignee: HIDEEP INC., Gyeonggi-Do (KR)

( * ) Notice: Subject to any disclaimer, the term of this patent is extended or adjusted under 35 U.S.C. 154(b) by 22 days.

(21) Appl. No.: 16/463,943

(22) PCT Filed: Sep. 15, 2017

(86) PCT No.: PCT/KR2017/010117
§ 371 (c)(1),
(2) Date: May 24, 2019

(87) PCT Pub. No.: WO2018/097460
PCT Pub. Date: May 31, 2018

(65) Prior Publication Data
US 2020/0387279 A1    Dec. 10, 2020

(30) Foreign Application Priority Data
Nov. 24, 2016  (KR) .................. 10-2016-0157244

(51) Int. Cl.
*G06F 3/04817* (2022.01)
*G06F 3/0488* (2022.01)
(Continued)

(52) U.S. Cl.
CPC .......... *G06F 3/0488* (2013.01); *G06F 3/0447* (2019.05); *G06F 3/04817* (2013.01);
(Continued)

(58) Field of Classification Search
None
See application file for complete search history.

(56) References Cited

U.S. PATENT DOCUMENTS

2011/0221693 A1* 9/2011 Miyazaki ............ G06F 3/04886
345/173
2016/0188181 A1* 6/2016 Smith ................. G06F 3/04886
715/765
(Continued)

FOREIGN PATENT DOCUMENTS

JP     2002132420 A    5/2002
JP     2005-352924     12/2005
(Continued)

OTHER PUBLICATIONS

Office Action issued in corresponding Korean Application No. 10-2016-0157244 dated Sep. 28, 2018, with English translation.
(Continued)

*Primary Examiner* — Amr A Awad
*Assistant Examiner* — Donna V Bocar
(74) *Attorney, Agent, or Firm* — The Belles Group, P.C.

(57) ABSTRACT

A touch input device may be provided that includes: a touch screen including at least one region; and a processor which receives first touch information on a first region included in the at least one region and determines whether to change state information of an icon included in the first region, and controls, based on the determination, such that at least one of the state information of the icon included in the first region and state information of an icon included in a second region which is included in the touch screen and is different from the first region is changed.

12 Claims, 23 Drawing Sheets

(51) Int. Cl.
*G06F 3/044* (2006.01)
*G06F 3/04845* (2022.01)
*G06F 3/041* (2006.01)

(52) U.S. Cl.
CPC ........ *G06F 3/04845* (2013.01); *G06F 3/0418* (2013.01); *G06F 3/0443* (2019.05); *G06F 3/0445* (2019.05); *G06F 3/0446* (2019.05); *G06F 3/04166* (2019.05); *G06F 2203/04804* (2013.01)

(56) References Cited

U.S. PATENT DOCUMENTS

| | | | | |
|---|---|---|---|---|
| 2017/0153712 | A1* | 6/2017 | Kawai | G06F 3/014 |
| 2017/0351403 | A1* | 12/2017 | Yazdani | G06T 11/001 |
| 2018/0067557 | A1* | 3/2018 | Robert | G06F 3/016 |
| 2019/0146625 | A1* | 5/2019 | Zhu | G06F 9/451 |
| | | | | 345/173 |

FOREIGN PATENT DOCUMENTS

| | | |
|---|---|---|
| JP | 2006126002 A | 5/2006 |
| JP | 2008-305174 | 12/2008 |
| JP | 2014-134867 A | 7/2014 |
| JP | 2015-519655 | 7/2015 |
| JP | 2016-085680 A | 5/2016 |
| JP | 2014-134867 A | 7/2016 |
| KR | 10-2016-0051986 A | 5/2016 |
| KR | 10-1643418 B1 | 7/2016 |
| KR | 10-1667452 B1 | 10/2016 |

OTHER PUBLICATIONS

Office Action issued in corresponding Japanese Application No. dated May 26, 2020, with English translation.
Korean International Search Report, PCT/KR2017/010117, dated Nov. 24, 2016, pp. 1-3.

* cited by examiner

[fig 1]
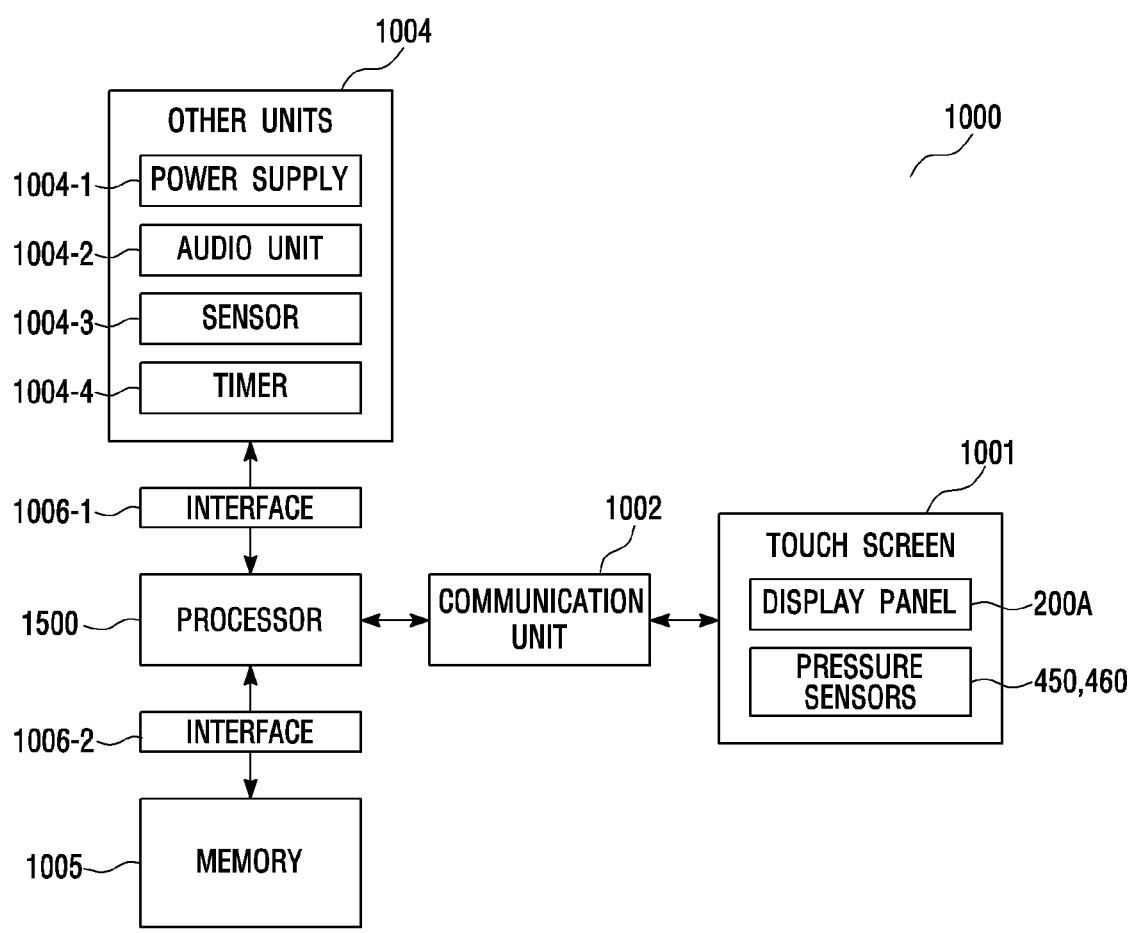

[fig 2a]
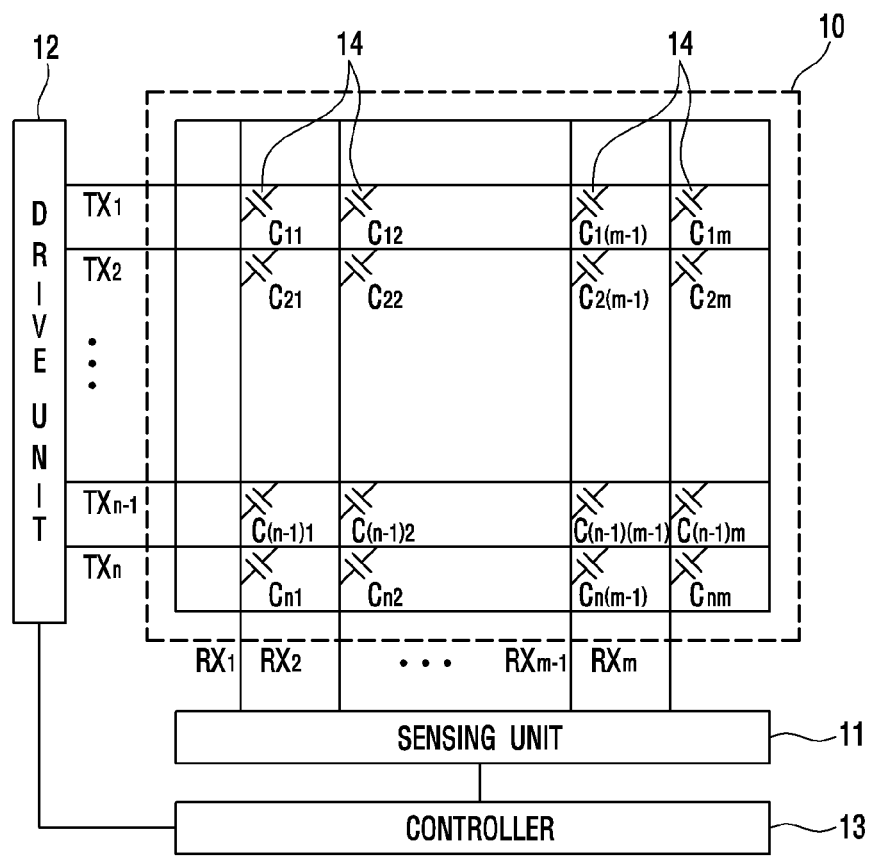

[fig 2b]
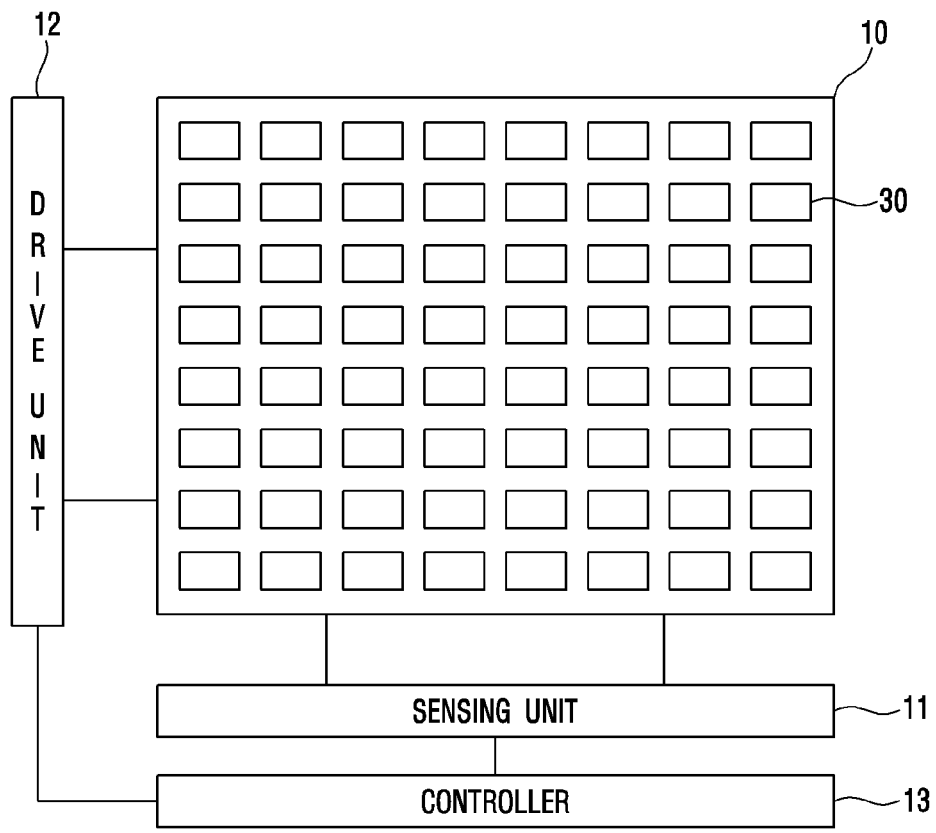
[fig 2c]
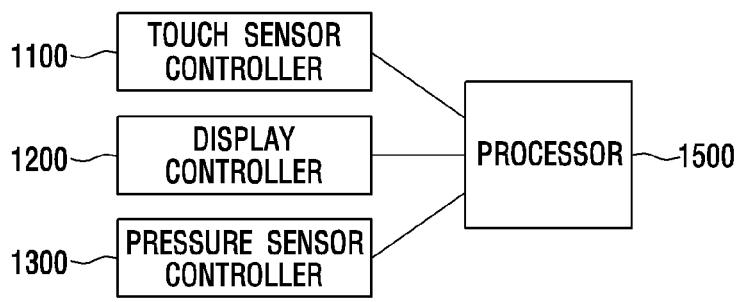

[fig 3a]
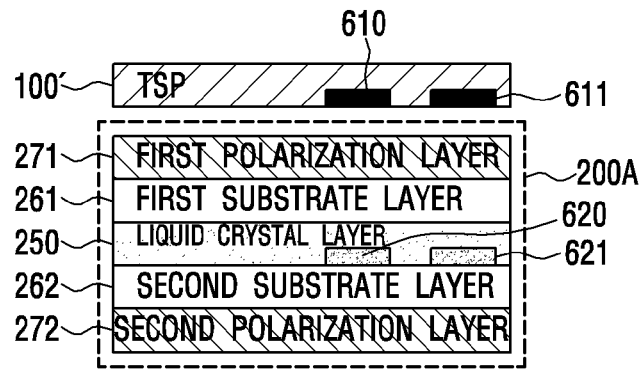
[fig 3b]
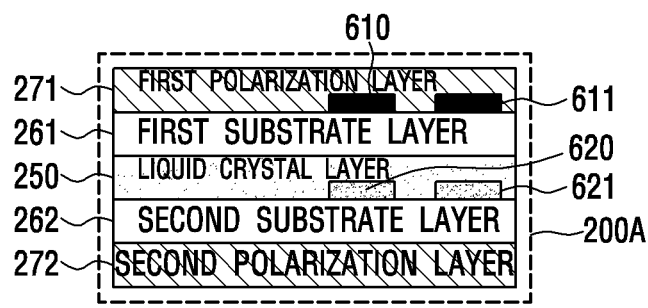
[fig 3c]
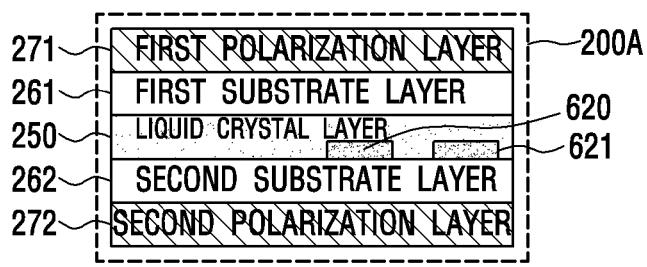

[fig 3d]
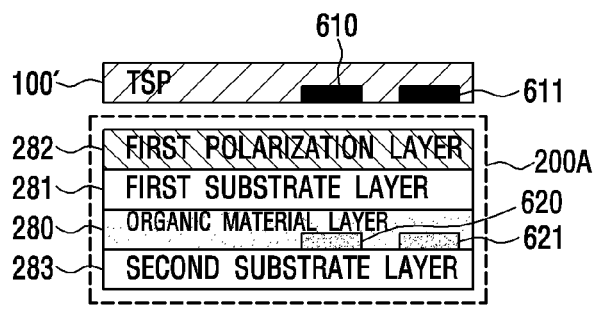
[fig 3e]
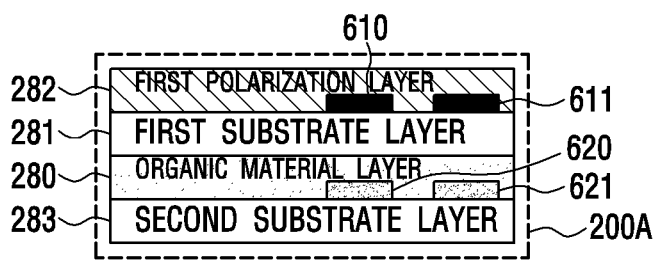
[fig 3f]
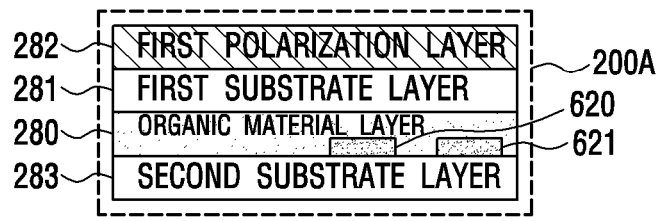

【fig 4a】
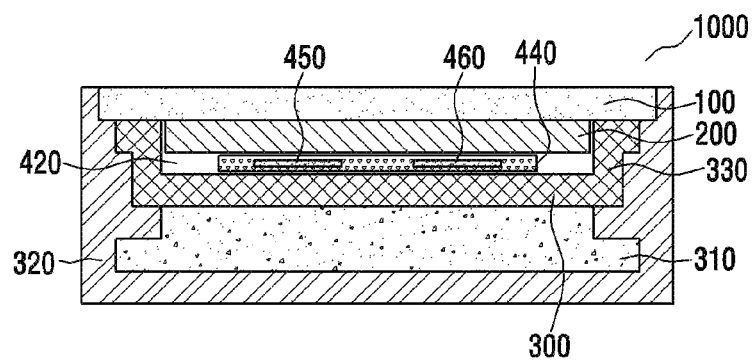
【fig 4b】
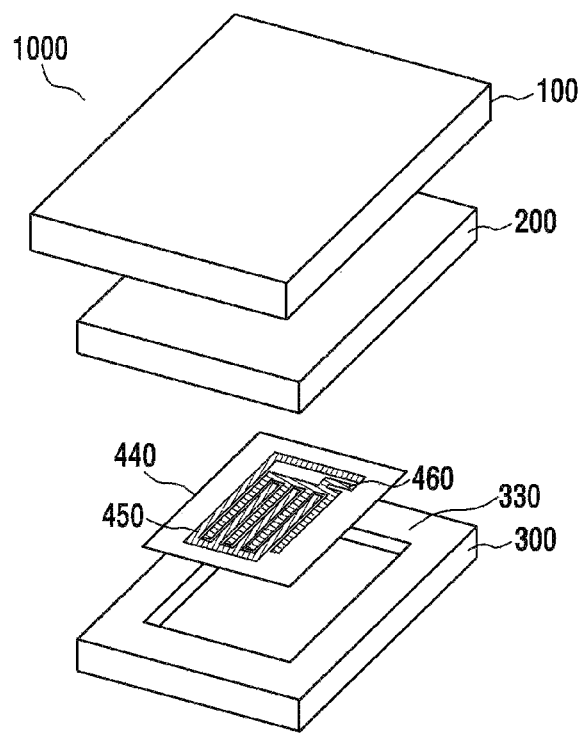

[fig 4c]
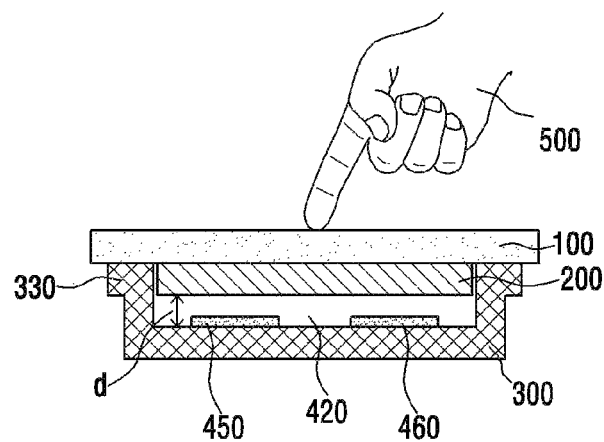
[fig 4d]
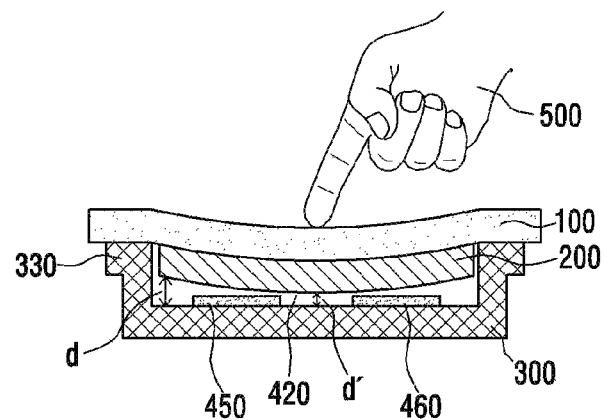

[fig 4e]
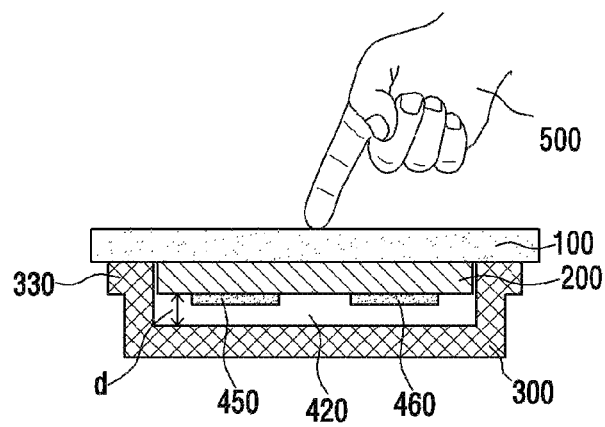
[fig 4f]
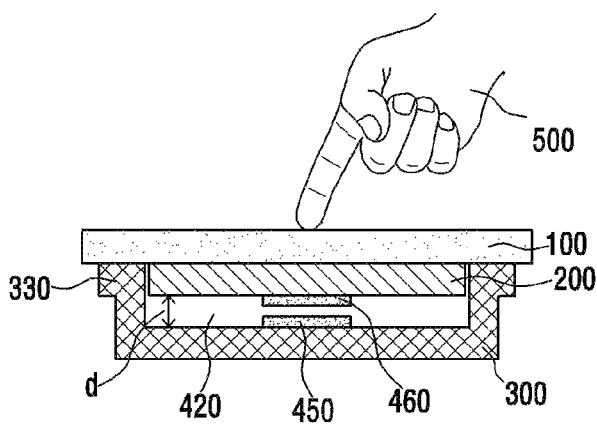

[fig 5]
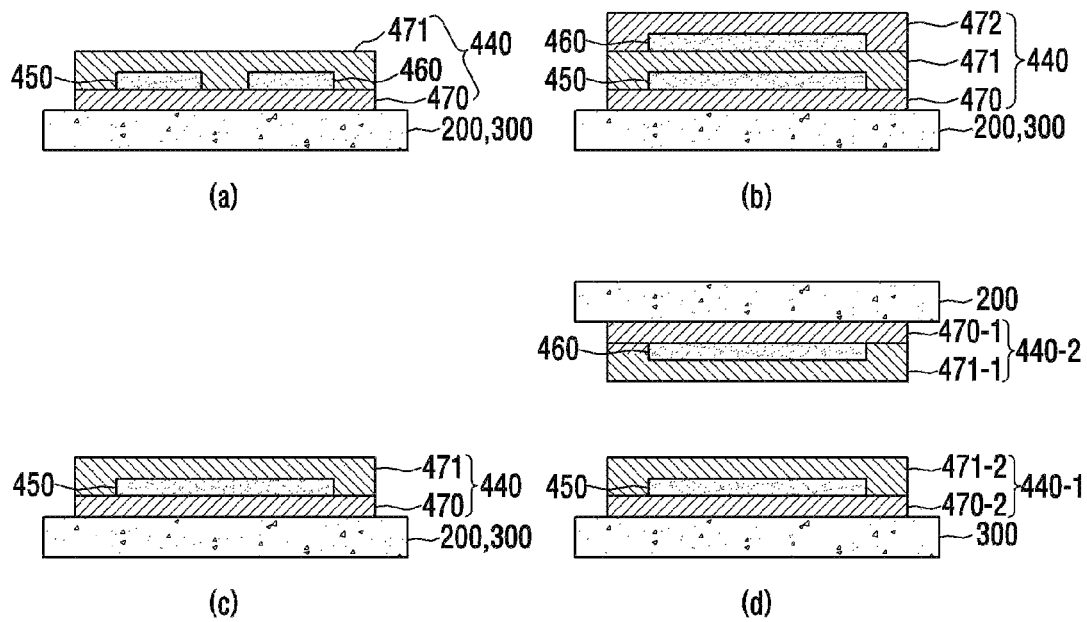
[fig 6a]
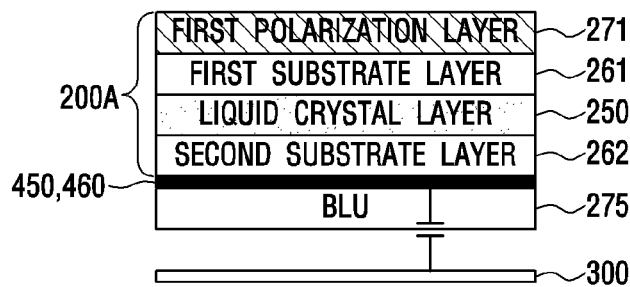
[fig 6b]
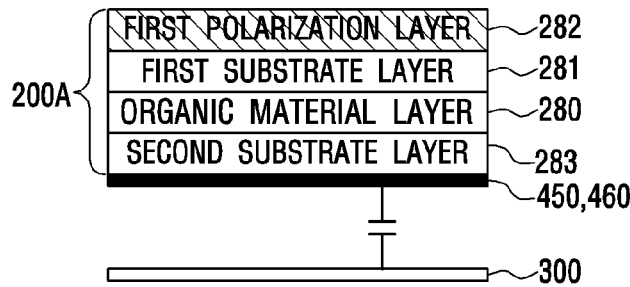

【fig 6c】
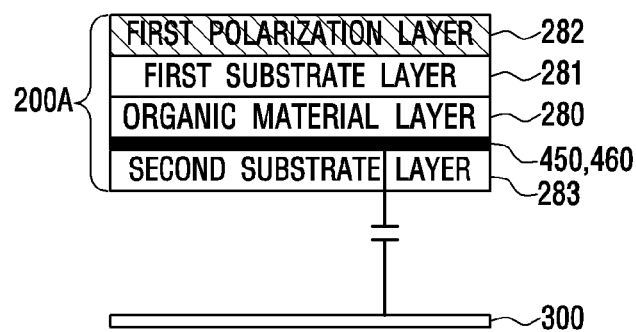
【fig 7a】
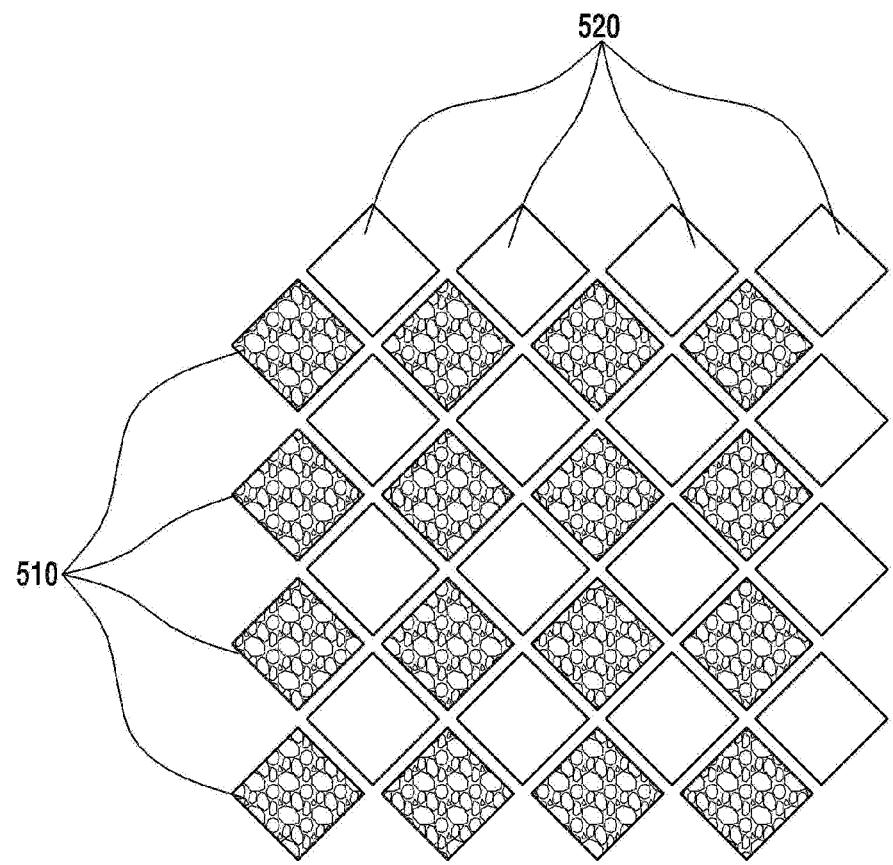

[fig 7b]
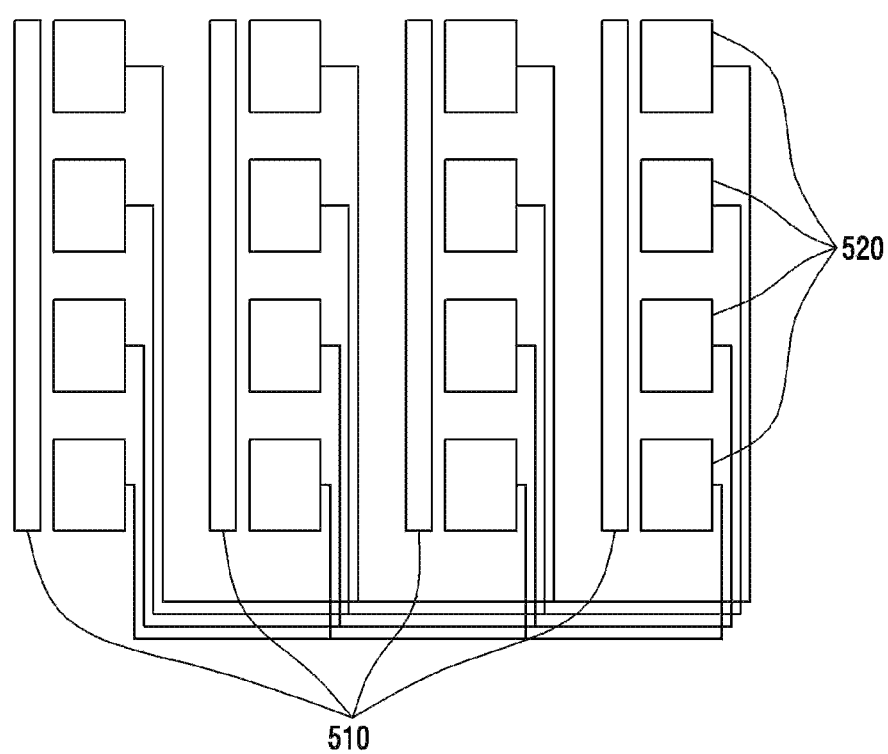

[fig 7c]
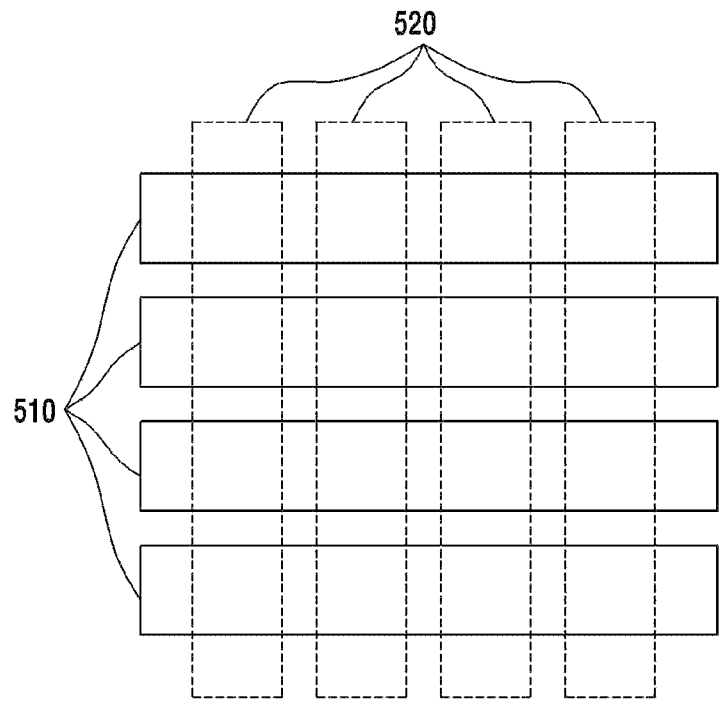
[fig 7d]
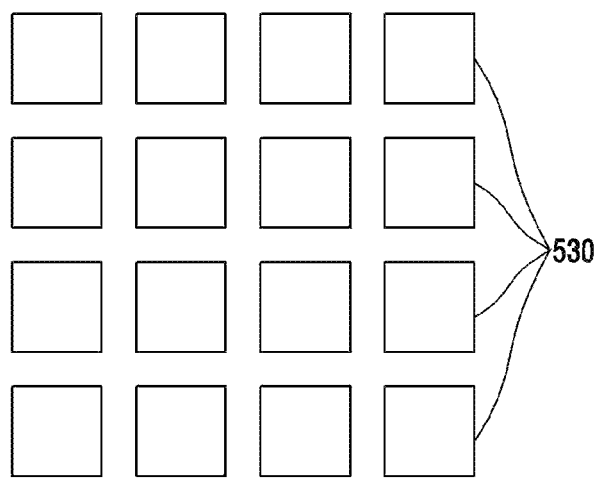

【fig 8】
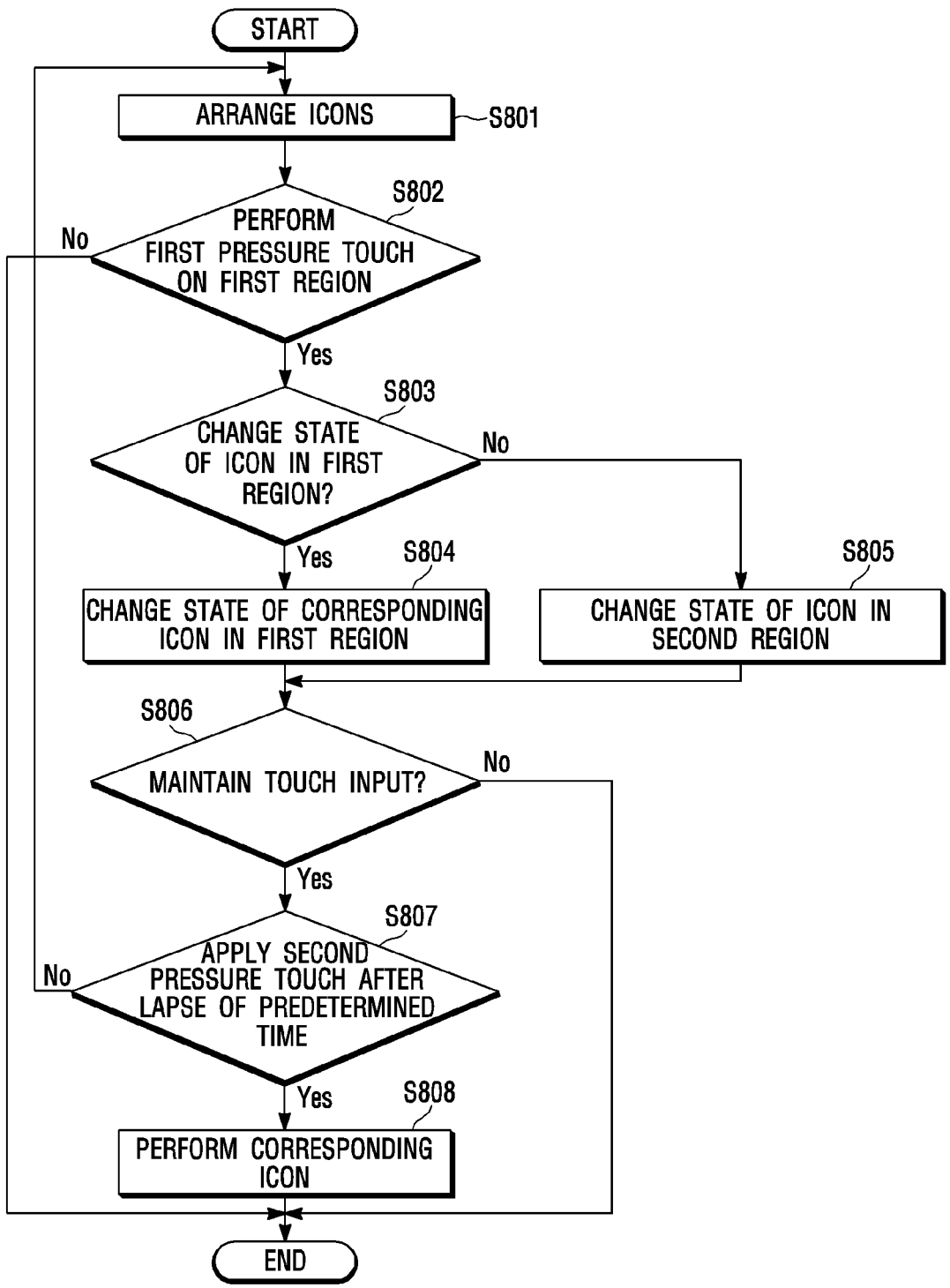

[fig 9a]
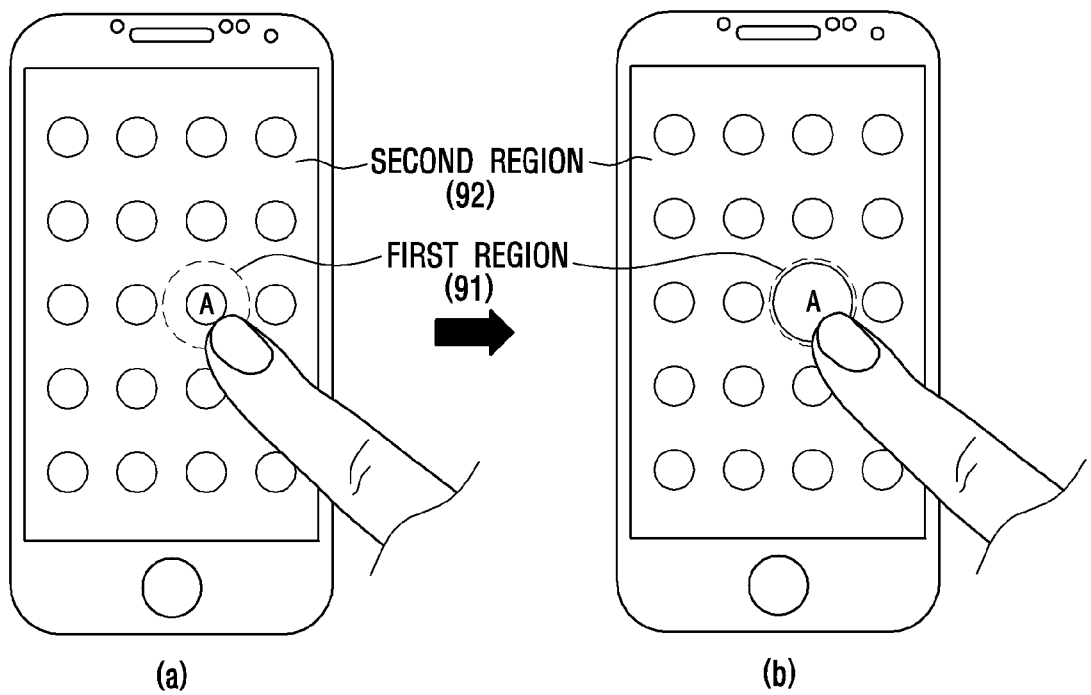
(a) (b)
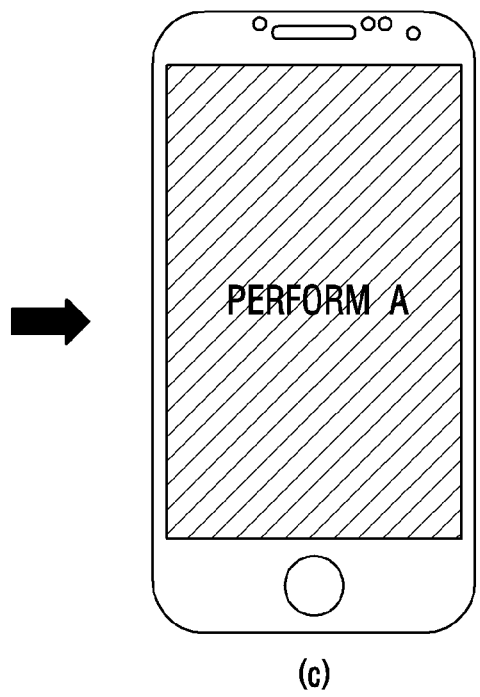
(c)

【fig 9b】
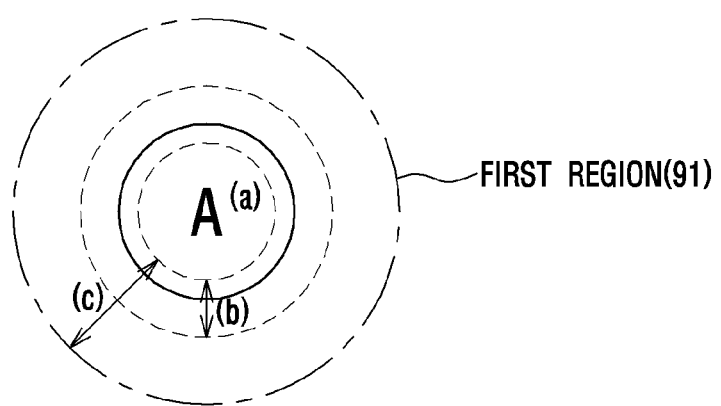

[fig 9c]
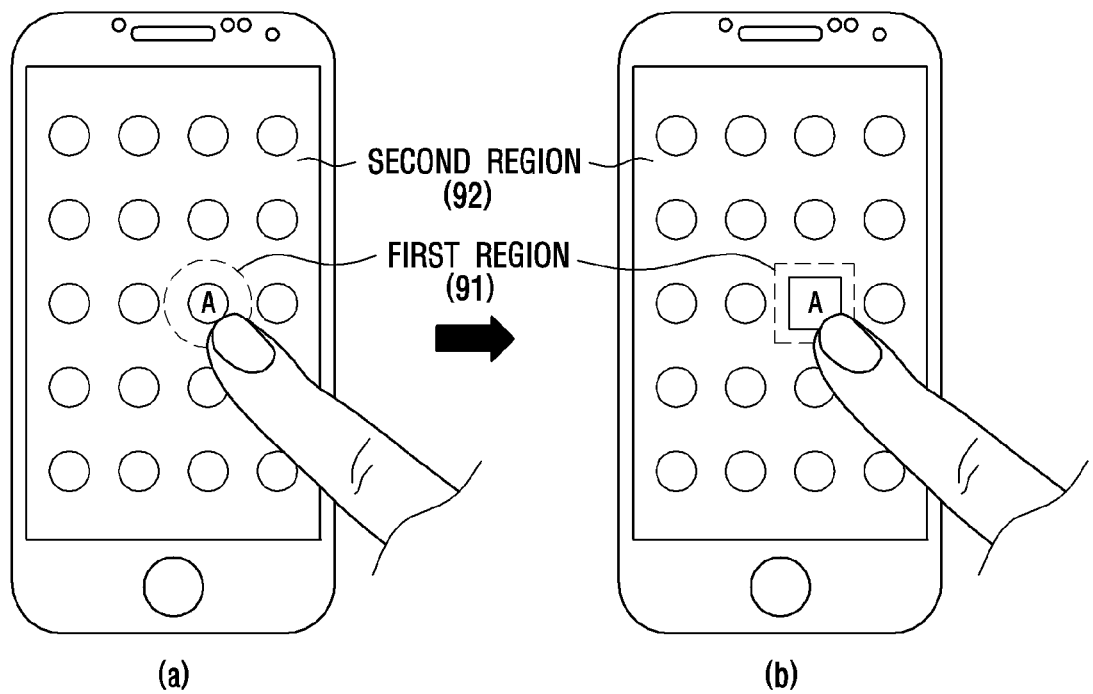
(a)    (b)
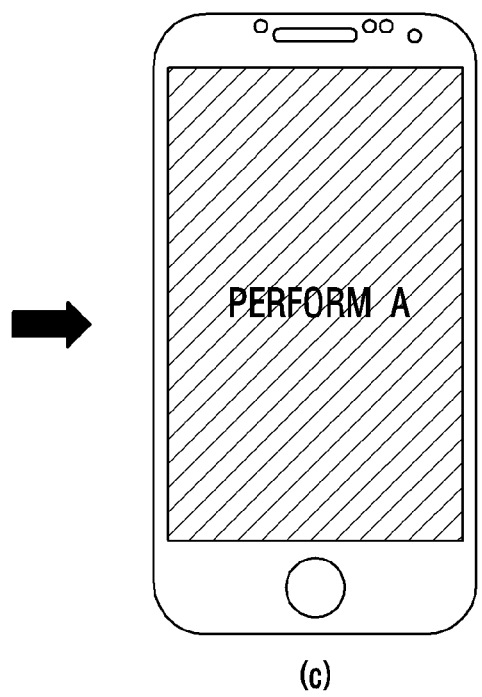
(c)

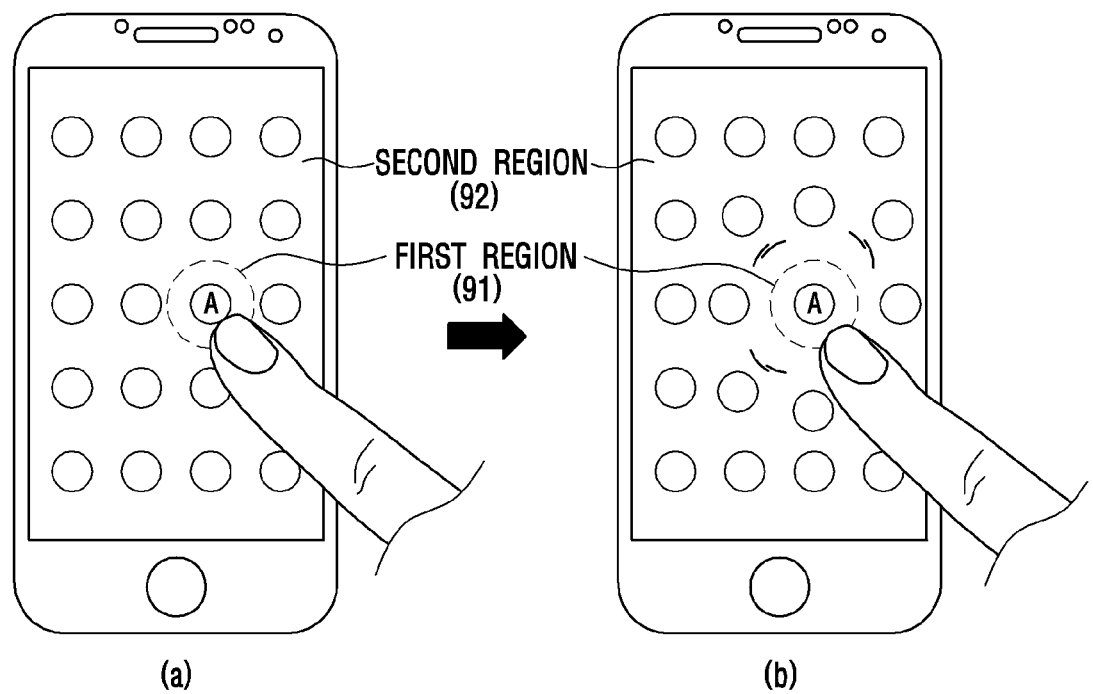
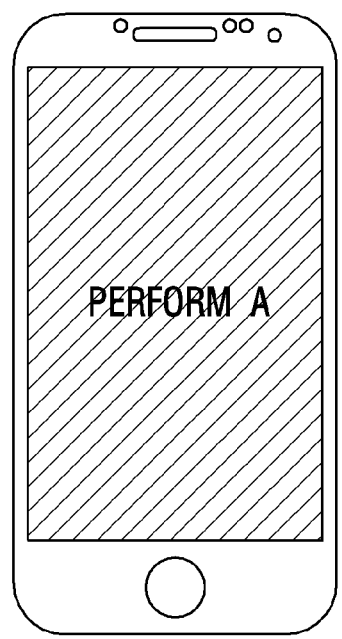
[fig 9d]

[fig 9e]
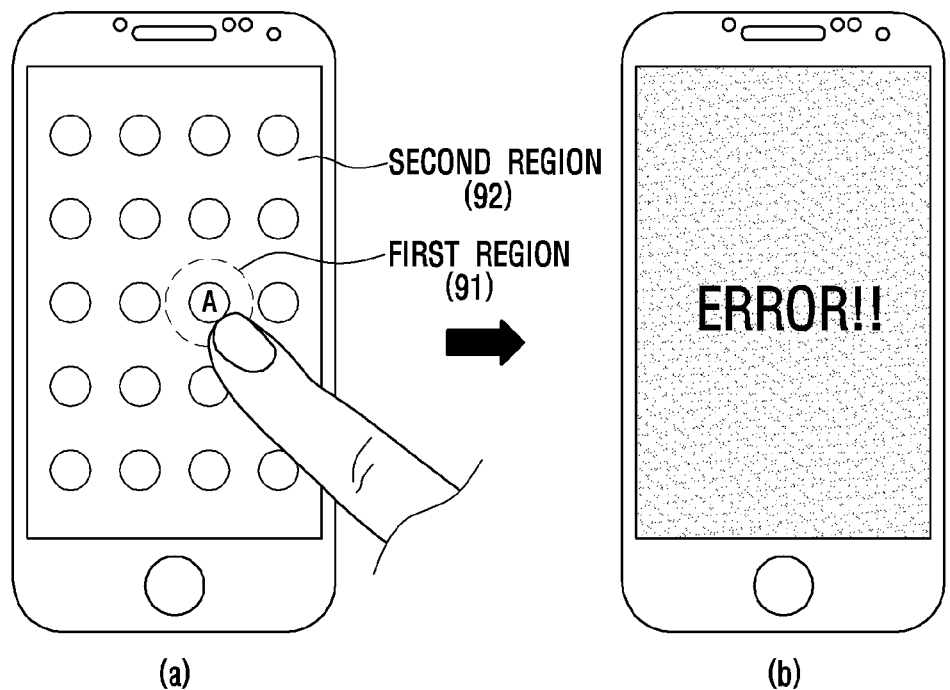
(a)  (b)
[fig 10]
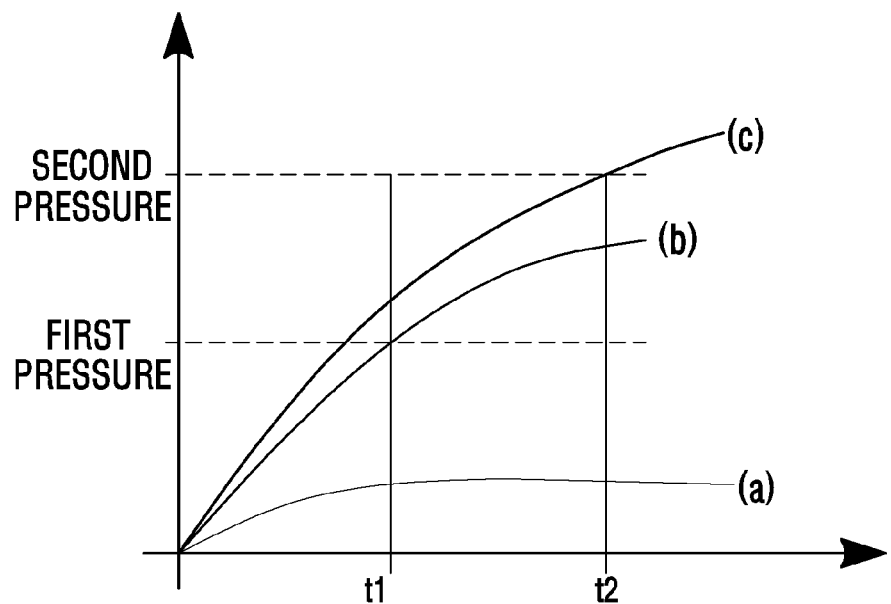

[fig 11]
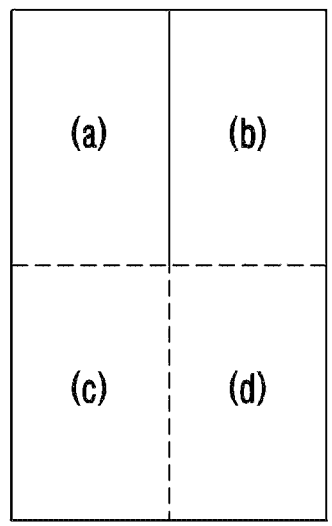
[fig 12a]
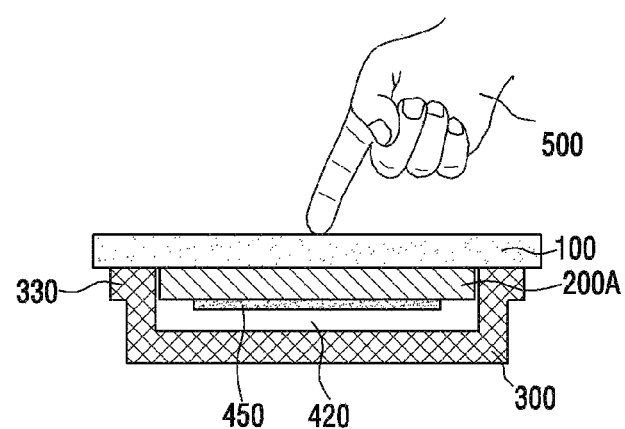

[fig 12b]
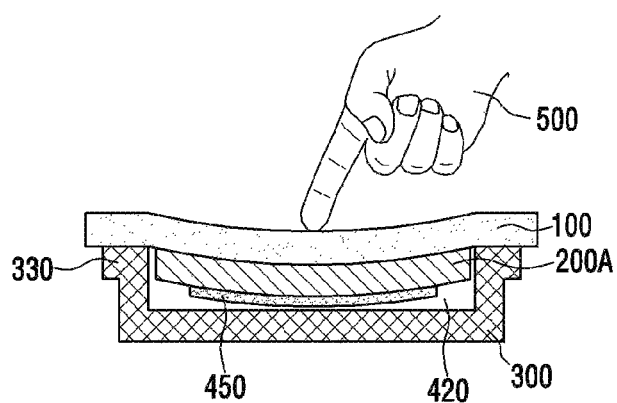
[fig 13a]
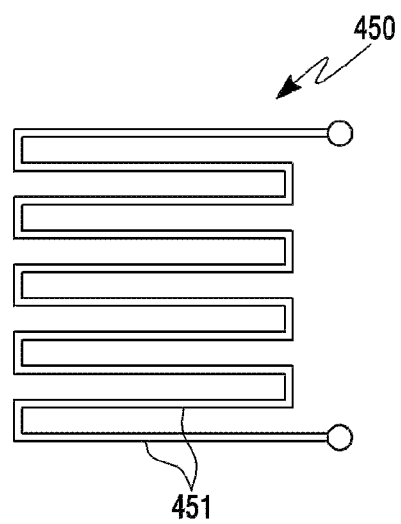

[fig 13b]
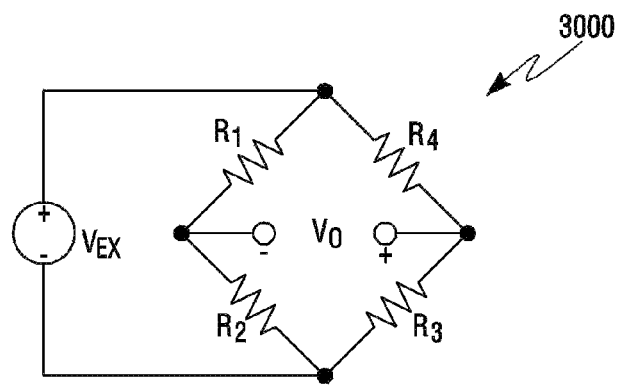
[fig 13c]
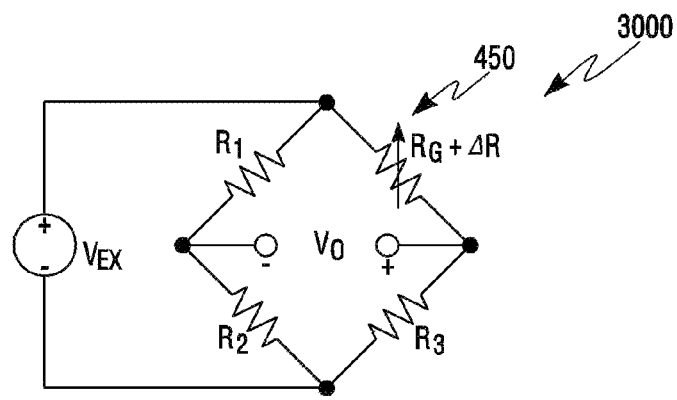

[fig 13d]
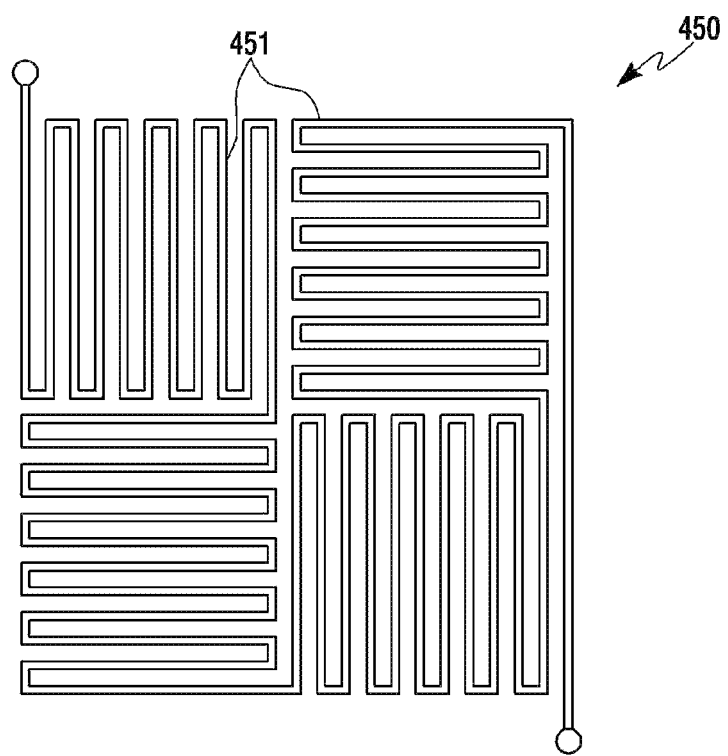

[fig 13e]
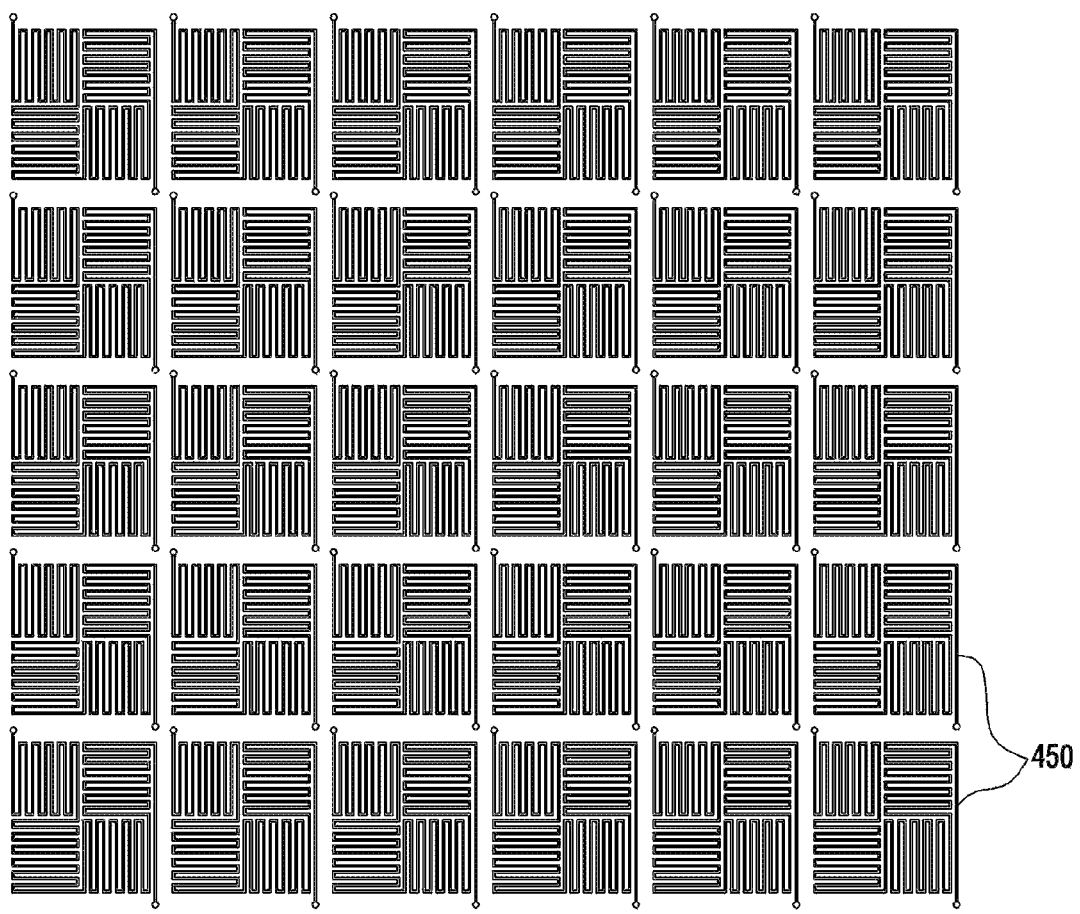

TOUCH INPUT DEVICE HAVING RESIZEABLE ICONS, AND METHODS OF USING SAME

CROSS-REFERENCE TO RELATED PATENT APPLICATIONS

The present application is a U.S. national stage application under 35 U.S.C. § 371 of PCT Application No. PCT/KR2017/010117, filed Sep. 15, 2017, which claims priority to Korean Patent Application No. 10-2016-0157244, filed Nov. 24, 2016. The disclosures of the aforementioned priority applications are incorporated herein by reference in their entireties.

TECHNICAL FIELD

The present disclosure relates to a touch input device and more particularly to a touch input device of which the visibility is improved by displaying an interface due to user's touch operation on a touch screen.

BACKGROUND ART

Various kinds of input devices are being used to operate a computing system. For example, the input device includes a button, key, joystick and touch screen. Since the touch screen is easy and simple to operate, the touch screen is increasingly being used to operate the computing system.

The touch screen may constitute a touch surface of a touch input device including a touch sensor panel which may be a transparent panel including a touch-sensitive surface. The touch sensor panel is attached to the front side of a display screen, and then the touch-sensitive surface may cover the visible side of the display screen. The touch screen allows a user to operate the computing system by simply touching the touch screen by a finger, etc. Generally, the computing system recognizes the touch and a position of the touch on the touch screen and analyzes the touch, and thus, performs operations in accordance with the analysis.

Here, there is a requirement for efficiently providing an interface due to user's touch operation on a touch screen by visually displaying the user's touch operation.

DISCLOSURE

Technical Problem

The purpose of the present invention is to provide a touch input device including a display module capable of detecting not only a touch position on a touch screen but also a magnitude of touch pressure.

Another purpose of the present invention is to improve the visibility of the display module by displaying a touch screen as desired by a user, and particularly is to make it easier to operate icons in performing the icons.

Technical Solution

One embodiment is a touch input device including: a touch screen including at least one region; and a processor which receives first touch information on a first region included in the at least one region and determines whether to change state information of an icon included in the first region, and controls, based on the determination, such that at least one of the state information of the icon included in the first region and state information of an icon included in a second region which is included in the touch screen and is different from the first region is changed.

Advantageous Effects

According to the embodiment of the present invention, it is possible to provide a touch input device including a display module capable of detecting not only a touch position on a touch screen but also a magnitude of touch pressure.

Also, according to the embodiment of the present invention, it is possible to improve the visibility of the display module by displaying a touch screen as desired by a user, and particularly is to make it easier to operate icons in performing the icons.

DESCRIPTION OF DRAWINGS

FIG. 1 is a block diagram showing a touch input device 1000 according to an embodiment of the present invention;

FIGS. 2a and 2b are schematic views showing a capacitive touch sensor according to the embodiment of the present invention and a configuration for the operation of the same;

FIG. 2c shows a control block for controlling a touch position, touch pressure, and display operation in the touch input device including a display panel;

FIGS. 3a to 3f are conceptual views showing relative positions of the touch sensor and a pressure sensor with respect to the display panel in the touch input device according to the embodiment of the present invention;

FIGS. 4a to 4f show an example in which the pressure sensor formed in the form of an electrode sheet is attached to the touch input device according to the embodiment of the present invention;

FIG. 5 shows a cross section of an electrode sheet according to the embodiment of the present invention;

FIGS. 6a to 6c show an example in which the pressure sensor is directly formed in the touch input device according to the embodiment of the present invention;

FIGS. 7a to 7d show a shape of the electrode included in the touch input device according to the embodiment of the present invention;

FIG. 8 is a flowchart of a touch input method according to the embodiment of the present invention;

FIG. 9 shows an interface displayed on a touch screen 1001 for describing the flow of the touch input method according to the embodiment of the present invention;

FIG. 10 is a view for describing the touch pressure according to the embodiment of the present invention and a touch type according to the touch pressure;

FIG. 11 shows an example of the divided touch screen 1001 according to the embodiment of the present invention; and FIGS. 12 to 13 are views for describing touch pressure detection using a pressure sensor according to the embodiment of the present invention.

MODE FOR INVENTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, a touch input device according to an embodiment of the present invention will be described with reference to the accompanying drawings. Hereinafter, while a capacitive touch sensor panel 100' and a capacitive touch detection module 400 are exemplified below, the touch sensor panel 100' and the touch detection module 400 which are capable of detecting a touch position and/or touch pressure in any manner may be applied.

FIG. 1 is a block diagram showing the touch input device 1000 according to the embodiment of the present invention.

As shown in FIG. 1, the touch input device 1000 according to the embodiment of the present invention may include a touch screen 1001, a communication unit 1002, a processor 1500, other units 1004, interfaces 1006-1 and 1006-2, and a memory 1005.

The touch input device 1000 according to the embodiment of the present invention may be a portable electronic device such as a laptop computer, a personal digital assistant (PDA), and a smartphone. Also, the touch input device 1000 according to the embodiment of the present invention may be a non-portable electronic device such as a desktop computer, a smart television.

The touch screen 1001 according to the embodiment of the present invention allows a user to operate a computing system by touching the screen with an object such as a finger. In general, the touch screen 1001 recognizes the touch on the panel, and then the computing system analyzes the touch to perform operations accordingly.

Further, the touch screen 1001 according to the embodiment of the present invention may include at least one region for receiving a touch input from the user. The touch input received through the touch screen 1001 may be input to the processor 1500 through the communication unit 1002. Also, the processor 1500 receives the touch input and executes commands according to the touch input, and then outputs command execution results to the touch screen 1001 through the communication unit 1002.

The touch screen 1001 according to the embodiment of the present invention may include a display panel 200A and pressure sensors 450 and 460.

Pressure sensors 450 and 460 may detect the touch pressure by using a capacitance change amount based on the touch input through the touch screen 1001 by the object such as a finger or may detect the pressure or force by using a change of a resistance value. Specifically, the touch pressure according to the capacitance change amount may be detected by using the pressure sensor shown in FIG. 3 or the pressure sensors 450 and 460 shown in FIGS. 4 to 6, or alternatively the touch pressure or touch force may be detected by using the change of the resistance value of the pressure sensor 450 shown in FIG. 12 and figures after FIG. 12. Touch information based on the thus detected touch pressure may be output through the display panel 200A.

The processor 1500 according to the embodiment of the present invention may control a process for executing command transmission reception and the corresponding command from the memory 1005, the communication unit 1002, and the touch screen 1001. Also, the processor 1500 receives a user touch input through the touch screen 1001 including at least one region, and determines whether to change state information of an icon included in a first region. Based on the determination, the processor 1500 may control such that the state information of the icon included in the first region or state information of an icon included in a second region which is included in the touch screen and is different from the first region is changed. The processor 1500 may be driven by applying all examples of the pressure detection method described in FIGS. 3 to 7.

The communication unit 1002 receives the touch input from the touch screen 1001 and transmits the touch input to the processor 1500. The interfaces 1006-1 and 1006-2 mediate data transmission and reception between the processor 1500, the other units 1004, and the memory 1005.

The memory 1005 stores commands through the data transmission and reception with the processor 1500. When the number of the icons on the touch screen 1001 is determined in advance according to the embodiment of the present invention, corresponding contents may be stored in the memory 1005. In addition, the memory 1005 may store setting information on whether to change the state information on the region that the touch screen includes.

The other units 1004 may include a power supply 1004-1 which supplies power for operating each of the components, an audio unit 1004-2 which is involved in the input and output of voice and sound, a sensing unit which includes a gyro sensor, an acceleration sensor, a vibration sensor, a proximity sensor, a magnetic sensor, etc., and a timer 1004-4 which checks a call time period, a touch duration time, etc. The power supply 1004-1, the audio unit 1004-2, the sensing unit, and the timer 1004-4 are intended to perform basic functions and to maintain the performance of the touch input device 1000 according to the embodiment of the present invention.

However, the above components may be omitted or replaced if necessary, or alternatively, other components may be added.

FIG. 2a is a schematic views showing a capacitive touch sensor 10 included in the touch input device according to the embodiment of the present invention and a configuration for the operation of the same. Referring to FIG. 2a, the touch sensor 10 may include a plurality of drive electrodes TX1 to TXn and a plurality of receiving electrodes RX1 to RXm. The touch sensor panel 100' may include a drive unit 12 which applies a drive signal to the plurality of drive electrodes TX1 to TXn for the purpose of the operation of the touch sensor 10, and a sensing unit 11 which detects whether the touch has occurred or not and a touch position by receiving a sensing signal including information on the capacitance change amount changing according to the touch on a touch surface from the plurality of receiving electrodes RX1 to RXm.

As shown in FIG. 2a, the touch sensor 10 may include the plurality of drive electrodes TX1 to TXn and the plurality of receiving electrodes RX1 to RXm. While FIG. 2a shows that the plurality of drive electrodes TX1 to TXn and the plurality of receiving electrodes RX1 to RXm of the touch sensor 10 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitudes of the values may be changed according to the embodiment.

The plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

As shown in FIGS. 7a and 7b, in the touch sensor 10 according to the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the top surface of a below-described display module 200.

Also, as shown in FIG. 7c, the plurality of drive electrodes TX1 to TXn and the plurality of receiving electrodes RX1 to RXm may be formed in different layers. For example, one of the plurality of drive electrodes TX1 to TXn and the plurality of receiving electrodes RX1 to RXm may be formed on the top surface of the display module 200, and the other may be formed on the bottom surface of a below-described cover or within the display module 200.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may be formed to include at least any one of silver ink, copper, nano silver, or carbon nanotube (CNT). Also, the drive electrode TX and the receiving electrode RX may be made of metal mesh.

The drive unit 12 according to the embodiment of the present invention may apply a drive signal to the drive electrodes TX1 to TXn. In the embodiment, one drive signal may be sequentially applied at a time to the first drive electrode TX1 to the n-th drive electrode TXn. The drive signal may be applied again repeatedly. This is only an example. The drive signal may be applied to the plurality of drive electrodes at the same time in accordance with the embodiment.

Through the receiving electrodes RX1 to RXm, the sensing unit 11 receives the sensing signal including information on a capacitance (Cm) 14 generated between the receiving electrodes RX1 to RXm and the drive electrodes TX1 to TXn to which the drive signal has been applied, thereby detecting whether or not the touch has occurred and the touch position. For example, the sensing signal may be a signal coupled by the capacitance (Cm) 14 generated between the receiving electrode RX and the drive electrode TX to which the drive signal has been applied. As such, the process of sensing the drive signal applied from the first drive electrode TX1 to the n-th drive electrode TXn through the receiving electrodes RX1 to RXm can be referred to as a process of scanning the touch sensor 10.

For example, the sensing unit 11 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 14, and then converts the integrated current signal into voltage. The sensing unit 11 may further include an analog to digital converter (ADC) (not shown) which converts the integrated data by the receiver into digital data. Later, the digital data may be input to a processor (not shown) and processed to obtain information on the touch on the touch sensor 10. The sensing unit 11 may include the ADC and processor as well as the receiver.

A controller 13 may perform a function of controlling the operations of the drive unit 12 and the sensing unit 11. For example, the controller 13 generates and transmits a drive control signal to the drive unit 12, so that the drive signal can be applied to a predetermined drive electrode TX1 for a predetermined time period. Also, the controller 13 generates and transmits the sense control signal to the sensing unit 11, so that the sensing unit 11 may receive the sensing signal from the predetermined receiving electrode RX for a predetermined time period and perform a predetermined function.

In FIG. 2a, the drive unit 12 and the sensing unit 11 may constitute a touch detection device (not shown) capable of detecting whether the touch has occurred on the touch sensor 10 or not and where the touch has occurred. The touch detection device may further include the controller 13. The touch detection device may be integrated and implemented on a touch sensing integrated circuit IC in the touch input device including the touch sensor 10. The drive electrode TX and the receiving electrode RX included in the touch sensor 10 may be connected to the drive unit 12 and the sensing unit 11 included in touch sensing IC through, for example, a conductive trace and/or a conductive pattern printed on a circuit board, or the like. The touch sensing IC may be placed on a circuit board on which the conductive pattern has been printed, for example, a first printed circuit board (hereafter, referred to as a first PCB). According to the embodiment, the touch sensing IC may be mounted on a main board for operation of the touch input device.

As described above, a capacitance (Cm) with a predetermined value is formed at each crossing of the drive electrode TX and the receiving electrode RX. When an object such as a finger approaches close to the touch sensor 10, the value of the capacitance may be changed. In FIG. 2a, the capacitance may represent a mutual capacitance (Cm). The sensing unit 11 detects such electrical characteristics, thereby detecting whether or not the touch has occurred on the touch sensor 10 and/or where the touch has occurred. For example, the sensing unit 11 is able to detect whether the touch has occurred on the surface of the touch sensor 10 comprised of a two-dimensional plane consisting of a first axis and a second axis and/or where the touch has occurred.

More specifically, when the touch occurs on the touch sensor 10, the drive electrode TX to which the drive signal has been applied is detected, so that the position of the second axial direction of the touch can be detected. Likewise, when the touch occurs on the touch sensor 10, the capacitance change is detected from the reception signal received through the receiving electrode RX, so that the position of the first axial direction of the touch can be detected.

Although the foregoing has described the operation method of the touch sensor 10 detecting the touch position on the basis of the mutual capacitance change amount between the drive electrode TX and the receiving electrode RX, the embodiment of the present invention is not limited to this. That is, as shown in FIG. 2b, it is also possible to detect the touch position on the basis of a self-capacitance change amount.

FIG. 2b is a schematic view for describing another capacitive touch sensor 10 included in a touch input device according to another embodiment of the present invention and the operation thereof. A plurality of touch electrodes 30 are provided on the touch sensor 10 shown in FIG. 2b. Although the plurality of touch electrodes 30 may be, as shown in FIG. 7d, disposed at a regular interval in the form of a grid, the present invention is not limited to this.

The drive control signal generated by the controller 13 is transmitted to the drive unit 12. On the basis of the drive control signal, the drive unit 12 applies the drive signal to the predetermined touch electrode 30 for a predetermined time period. Also, the sense control signal generated by the controller 13 is transmitted to the sensing unit 11. On the basis of the sense control signal, the sensing unit 11 receives the sensing signal from the predetermined touch electrode 30 for a predetermined time period. Here, the sensing signal may be a signal for the change amount of the self-capacitance formed on the touch electrode 30.

Here, whether the touch has occurred on the touch sensor 10 or not and/or the touch position are detected by the sensing signal detected by the sensing unit 11. For example, since the coordinate of the touch electrode 30 has been known in advance, whether the touch of the object on the surface of the touch sensor 10 has occurred or not and/or the touch position can be detected.

In the foregoing, for convenience of description, it has been described that the drive unit 12 and the sensing unit 11 operate individually as a separate block. However, the operation to apply the drive signal to the touch electrode 30 and to receive the sensing signal from the touch electrode 30 can be also performed by one drive and sensing unit.

FIG. 2c shows a control block for controlling the touch position, touch pressure, and display operation in the touch input device including the display panel. In the touch input device 1000 configured to detect the touch pressure in addition to the display function and touch position detection, the control block may include a touch sensor controller 1100 for detecting the touch position, a display controller 1200 for driving the display panel, and a pressure sensor controller 1300 for detecting the pressure. The display controller 1200 may include a control circuit which receives an input from an application processor (AP) or a central processing unit (CPU) on a main board for the operation of the touch input device 1000 and displays the desired contents on the display panel 200A. The control circuit may include a display panel control IC, a graphic controller IC, and a circuit required to operate other display panel 200A.

The pressure sensor controller 1300 for detecting the pressure through the pressure sensor may be configured similarly to the touch sensor controller 1100, and thus, may operate similarly to the touch sensor controller 1100.

According to the embodiment, the touch sensor controller 1100, the display controller 1200, and the pressure sensor controller 1300 may be included as different components in the touch input device 1000. For example, the touch sensor controller 1100, the display controller 1200, and the pressure sensor controller 1300 may be composed of different chips respectively. Here, the processor 1500 of the touch input device 1000 may function as a host processor for the touch sensor controller 1100, the display controller 1200, and the pressure sensor controller 1300.

The touch input device 1000 according to the embodiment of the present invention may include an electronic device including a display screen and/or a touch screen, such as a cell phone, a personal data assistant (PDA), a smartphone, a tablet personal computer (PC), an MP3 player, a laptop, etc.

In order to manufacture such a thin and lightweight light-weighing touch input device 1000, the touch sensor controller 1100, the display controller 1200, and the pressure sensor controller 1300, which are, as described above, formed separately from each other, may be integrated into one or more configurations in accordance with the embodiment of the present invention. In addition to this, these controllers can be integrated into the processor 1500 respectively. Also, according to the embodiment of the present invention, the touch sensor 10 and/or the pressure sensor may be integrated into the display panel 200A.

In the touch input device 1000 according to the embodiment of the present invention, the touch sensor 10 for detecting the touch position may be positioned outside or inside the display panel 200A. The display panel 200A of the touch input device 1000 according to the embodiment of the present invention may be a display panel included in a liquid crystal display (LCD), a plasma display panel (PDP), an organic light emitting diode (OLED), etc. Accordingly, a user may perform the input operation by touching the touch surface while visually identifying an image displayed on the display panel.

FIGS. 3a to 3f are conceptual views showing a relative position of a display electrode with respect to the display panel 200A in the touch input device 1000 according to the embodiment of the present invention. First, the configuration of the display panel 200A using an LCD panel will be described with reference to FIGS. 3a to 3c.

As shown in FIGS. 3a to 3c, the LCD panel may include a liquid crystal layer 250 including a liquid crystal cell, a first substrate layer 261 and a second substrate layer 262 which include an electrode and are formed on both sides of the liquid crystal layer 250, and a first polarization layer 271 which is formed on one side of the first substrate layer 261 in a direction facing the liquid crystal layer 250 and a second polarization layer 272 which is formed on one side of the second substrate layer 262 in a direction facing the liquid crystal layer 250. Here, the first substrate layer 261 may be made of color filter glass, and the second substrate layer 262 may be made of TFT glass. Also, according to the embodiment, at least one of the first substrate layer 261 and the second substrate layer 262 may be made of a bendable material such as plastic. In FIGS. 3a to 3c, the second substrate layer 262 may be comprised of various layers including a data line, a gate line, TFT, a common electrode (Vcom), and a pixel electrode, etc. These electrical components may operate in such a manner as to generate a controlled electric field and orient liquid crystals located in the liquid crystal layer 250.

Next, the configuration of the display panel 200A using an OLED panel will be described with reference to FIGS. 3d to 3f.

As shown in FIGS. 3d to 3f, the OLED panel may include an organic material layer 280 including an organic light-emitting diode (OLED), a first substrate layer 281 and a second substrate layer 283 which include an electrode and are formed on both sides of the organic material layer 280, and a first polarization layer 282 which is formed on one side of the first substrate layer 281 in a direction facing the organic material layer 280. Here, the first substrate layer 281 may be made of encapsulation glass, and the second substrate layer 283 may be made of TFT glass. Also, according to the embodiment, at least one of the first substrate layer 281 and the second substrate layer 283 may be made of a bendable material such as plastic. The OLED panel shown in FIGS. 3d to 3f may include an electrode used to drive the display panel 200A, such as a gate line, a data line, a first power line (ELVDD), a second power line (ELVSS), etc. The organic light-emitting diode (OLED) panel is a self-light emitting display panel which uses a principle where, when current flows through a fluorescent or phosphorescent organic thin film and then electrons and electron holes are combined in the organic material layer, so that light is generated. The organic material constituting the light emitting layer determines the color of the light.

Specifically, the OLED uses a principle in which when electricity flows and an organic matter is applied on glass or plastic, the organic matter emits light. That is, the principle is that electron holes and electrons are injected into the anode and cathode of the organic matter respectively and are recombined in the light emitting layer, so that a high energy exciton is generated and the exciton releases the energy while falling down to a low energy state and then light with a particular wavelength is generated. Here, the color of the light is changed according to the organic matter of the light emitting layer.

The OLED includes a line-driven passive-matrix organic light-emitting diode (PM-OLED) and an individual driven active-matrix organic light-emitting diode (AM-OLED) in accordance with the operating characteristics of a pixel constituting a pixel matrix. None of them require a backlight. Therefore, the OLED enables a very thin display module to be implemented, has a constant contrast ratio according to an angle and obtains a good color reproductively depending on a temperature. Also, it is very economical in that non-driven pixel does not consume power.

In terms of operation, the PM-OLED emits light only during a scanning time at a high current, and the AM-OLED maintains a light emitting state only during a frame time at a low current. Therefore, the AM-OLED has a resolution higher than that of the PM-OLED and is advantageous for driving a large area display panel and consumes low power. Also, a thin film transistor (TFT) is embedded in the AM-OLED, and thus, each component can be individually controlled, so that it is easy to implement a delicate screen.

It will be apparent to a skilled person in the art that the LCD panel or the OLED panel may further include other structures so as to perform the display function and may be transformed.

FIGS. 3a and 3d show that, in the touch input device 1000, the touch sensor 10 is disposed outside the display panel 200A. The touch sensor may be disposed over the display panel 200A. A third electrode 610 and a fourth electrode 611 may be included in the touch sensor. The touch surface of the touch input device 1000 may be the surface of the touch sensor. Further, a first electrode 620 and a second electrode 621 may be disposed on the second substrate layers 262 and 283.

FIGS. 3b, 3c, 3e, and 3f show that, in the touch input device 1000, the touch sensor 10 is disposed within the display panel 200A.

In FIGS. 3b and 3e, the third electrode 610 and the fourth electrode 611 are disposed between the first substrate layers 261 and 281 and the first polarization layers 271 and 282. Here, the touch surface of the touch input device 1000 is the outer surface of the display panel 200A and may be the top surface or the bottom surface of the display panel 200A in FIGS. 3b and 3e. Also, the first electrode 620 and the second electrode 621 may be disposed on the second substrate layers 262 and 283.

FIGS. 3c and 3f, the first electrode 620 and the second electrode 621 may be disposed on the second substrate layers 262 and 283.

The touch surface of the touch input device 1000 shown in FIGS. 3a to 3f may be the outer surface of the display panel 200A and may be the top surface or the bottom surface of the display panel 200A. Here, in FIGS. 3a to 3f, the top surface or the bottom surface of the display panel 200A, which may be the touch surface, may be covered with a cover layer (not shown) in order to protect the display panel 200A.

Further, at least one of the first electrode 620 and the second electrode 621 may be an electrode used to drive the display panel 200A. Specifically, when the display panel 200A is the LCD panel, at least one of the first electrode 620 and the second electrode 621 may include at least one of a data line, a gate line, TFT, a common electrode (Vcom), and a pixel electrode, etc. When the display panel 200A is the OLED panel, at least one of the first electrode 620 and the second electrode 621 may include a data line, a gate line, a first power line (ELVDD), and a second power line (ELVSS). Further, although FIGS. 3a to 3f show that the first electrode 620 and the second electrode 621 are disposed on the second substrate layers 262 and 283, there is no limitation to this. The first electrode 620 and the second electrode 621 may be disposed under the first substrate layers 261 and 281, or alternatively one of the first electrode 620 and the second electrode 621 may be disposed on the second substrate layers 262 and 283, and the other may be disposed under the first substrate layers 261 and 281.

Also, according to the embodiment of the present invention, at least a portion of the touch sensor 10 may be configured to be placed within the display panel 200A and at least a portion of the remaining touch sensor 10 may be configured to be placed outside the display panel 200A. For example, one of the drive electrode TX and the receiving electrode RX, which constitute the touch sensor, may be configured to be placed outside the display panel 200A, and the other may be configured to be placed inside the display panel 200A. When the touch sensor 10 is placed within the display panel 200A, an electrode for operation of the touch sensor may be additionally disposed. However, various configurations and/or electrodes positioned inside the display panel 200A may be used as the touch sensor 10 for sensing the touch. Also, according to the embodiment of the present invention, at least a portion of the touch sensor 10 may be configured to be placed between the first substrate layers 261 and 281 and the second substrate layers 262 and 283 which are included in the display panel 200A. Here, the remaining portion other than the at least a portion of the touch sensor may be disposed both within the display panel 200A and at a position other than between the first substrate layers 261 and 281 and the second substrate layers 262 and 283.

Next, a method for detecting the touch position by using a portion of the first electrode 620, the second electrode 621, the third electrode 610, and the fourth electrode 611 shown in FIGS. 3a to 3f will be described.

The touch sensor 10 of the touch input device 1000 shown in FIGS. 3a, 3b, 3d, and 3e may be composed of the third electrode 610 and the fourth electrode 611. Specifically, the third electrode 610 and the fourth electrode 611 may function as the drive electrode and the receiving electrode described in FIG. 2a and may detect the touch position in accordance with the mutual capacitance between the third electrode 610 and the fourth electrode 611. Also, the third electrode 610 and the fourth electrode 611 may function as the single electrode 30 described in FIG. 2b and the touch position may be detected based on the self-capacitance of each of the third electrode 610 and the fourth electrode 611.

Further, the touch sensor 10 of the touch input device 1000 shown in FIGS. 3b and 3e may be composed of the third electrode 610 and the first electrode 620. Specifically, the third electrode 610 and the first electrode 620 may function as the drive electrode and the receiving electrode described in FIG. 2a and the touch position may be detected based on the mutual capacitance between the third electrode 610 and the first electrode 620. Here, when the first electrode 620 is used to drive the display panel 200A, the display panel 200A may be driven in a first time interval and the touch position may be detected in a second time interval different from the first time interval.

The touch sensor 10 of the touch input device 1000 shown in FIGS. 3c and 3f may be composed of the first electrode 620 and the second electrode 621. Specifically, the first electrode 620 and the second electrode 621 may function as the drive electrode and the receiving electrode described in FIG. 2a and the touch position may be detected based on the mutual capacitance between the first electrode 620 and the second electrode 621. Also, the first electrode 620 and the second electrode 621 may function as the single electrode 30 described in FIG. 2b and the touch position may be detected based on the self-capacitance of each of the first electrode 620 and the second electrode 621. Here, when the first electrode 620 and/or the second electrode 621 are used to drive the display panel 200A, the display panel 200A may be driven in the first time interval and the touch position may be detected in the second time interval different from the first time interval.

Next, a method for detecting the touch pressure by using a portion of the first electrode 620, the second electrode 621, the third electrode 610, and the fourth electrode 611 shown in FIGS. 3a to 3f will be described.

The pressure sensor of the touch input device 1000 shown in FIGS. 3a, 3b, 3d, and 3e may be composed of the third electrode 610 and the fourth electrode 611. Specifically, when the pressure is applied to the touch surface, a distance between the pressure sensor and a reference potential layer (not shown) which is spaced from the pressure sensor and is placed on, under or within the display panel 200A is changed. Due to the distance change between the pressure sensor and the reference potential layer, the mutual capacitance between the third electrode 610 and the fourth electrode 611 may be changed. As such, the touch pressure can be detected according to the mutual capacitance between the third electrode 610 and the fourth electrode 611. Here, when the touch sensor 10 is composed of the third electrode 610 and the fourth electrode 611, it is possible to detect the touch position and simultaneously to detect the touch pressure. Further, the touch position may be detected in the first time interval, and the touch pressure may be detected in the second time interval different from the first time interval. Also, when the first electrode 620 and/or the second electrode 621 used to drive the display panel 200A are disposed between the reference potential layer and the third electrode 610 and the fourth electrode 611, which are pressure sensors, the first electrode 620 and/or the second electrode 621 may float during the time interval in which the touch pressure is detected, in order to detect the capacitance change according to the distance change between the pressure sensor and the reference potential layer.

Also, the pressure sensor of the touch input device 1000 shown in FIGS. 3a, 3b, 3d, and 3e may be composed of at least one of the third electrode 610 and the fourth electrode 611. Specifically, when the pressure is applied to the touch surface, the distance between the pressure sensor and the reference potential layer (not shown) which is spaced from the pressure sensor and is placed on, under or within the display panel 200A is changed. Due to the distance change between the pressure sensor and the reference potential layer, the capacitance between the third electrode 610 and the reference potential layer, that is to say, the self-capacitance of the third electrode 610 and/or the capacitance between the fourth electrode 611 and the reference potential layer, that is to say, the self-capacitance of the fourth electrode 611 may change. As such, the touch pressure can be detected according to the self-capacitance of the third electrode 610 and/or the fourth electrode 611. Here, when the touch sensor 10 is composed of the third electrode 610 and the fourth electrode 611, it is possible to detect the touch position and simultaneously to detect the touch pressure. Also, the touch position may be detected in the first time interval, and the touch pressure may be detected in the second time interval different from the first time interval. Further, when the first electrode 620 and/or the second electrode 621 used to drive the display panel 200A are disposed between the reference potential layer and the third electrode 610 and/or the fourth electrode 611, which are pressure sensors, the first electrode 620 and/or the second electrode 621 may float during the time interval in which the touch pressure is detected, in order to detect the capacitance change according to the distance change between the pressure sensor and the reference potential layer.

Further, the touch sensor 10 of the touch input device 1000 shown in FIGS. 3b and 3e may be composed of the third electrode 610 and the first electrode 620. Specifically, when the pressure is applied to the touch surface, the distance between the pressure sensor and the reference potential layer (not shown) which is spaced from the pressure sensor and is placed on, under or within the display panel 200A is changed. Due to the distance change between the pressure sensor and the reference potential layer, the mutual capacitance between the third electrode 610 and the first electrode 620 may be changed. As such, the touch pressure can be detected according to the mutual capacitance between the third electrode 610 and the first electrode 620. Here, when the touch sensor 10 includes at least one of the third electrode 610 and the first electrode 620, it is possible to detect the touch position and simultaneously to detect the touch pressure. Also, the touch position may be detected in the first time interval, and the touch pressure may be detected in the second time interval different from the first time interval. Here, when the electrode used to drive the display panel 200A includes at least one of the first electrode 620 and the second electrode 621, the touch pressure can be detected simultaneously with driving the display panel 200A. Also, the display panel 200A may be driven in the first time interval and the touch pressure may be detected in the second time interval different from the first time interval. Here, when the touch sensor 10 includes at least one of the third electrode 610 and the fourth electrode 611 and the electrode used to drive the display panel 200A includes at least one of the first electrode 620 and the second electrode 621, the touch position and the touch pressure can be detected simultaneously with driving the display panel 200A. Further, the touch position may be detected in the first time interval, the touch pressure may be detected in the second time interval different from the first time interval, and the display panel 200A may be driven in a third time interval different from the first time interval and the second time interval. Also, when the second electrode 621 used to drive the display panel 200A is disposed between the reference potential layer and the third electrode 610 which is the pressure sensor, the second electrode 621 may float during the time interval in which the touch pressure is detected, in order to detect the capacitance change according to the distance change between the pressure sensor and the reference potential layer.

The pressure sensor of the touch input device 1000 shown in FIGS. 3a to 3f may be composed of the first electrode 620 and the second electrode 621. Specifically, when the pressure is applied to the touch surface, the distance between the pressure sensor and the reference potential layer (not shown) which is spaced from the pressure sensor and is placed on, under or within the display panel 200A is changed. Due to the distance change between the pressure sensor and the reference potential layer, the mutual capacitance between the first electrode 620 and the second electrode 621 may be changed. As such, the touch pressure can be detected according to the mutual capacitance between the first electrode 620 and the second electrode 621. Here, when the electrode used to drive the display panel 200A includes at least one of the first electrode 620 and the second electrode 621, the touch pressure can be detected simultaneously with driving the display panel 200A. Also, the display panel 200A may be driven in the first time interval and the touch pressure may be detected in the second time interval different from the first time interval. Here, when the touch sensor 10 includes at least one of the first electrode 620 and the second electrode 621, it is possible to detect the touch position and simultaneously to detect the touch pressure. Also, the touch position may be detected in the first time interval, and the touch pressure may be detected in the second time interval different from the first time interval. Here, when the touch sensor 10 includes at least one of the first electrode 620 and the second electrode 621 and the electrode used to drive the display panel 200A includes at least one of the first electrode 620 and the second electrode 621, the touch position and the touch pressure can be detected simultaneously with driving the display panel 200A. Further, the touch position may be detected in the first time interval, the touch pressure may be detected in the second time interval different from the first time interval, and the display panel 200A may be driven in the third time interval different from the first time interval and the second time interval.

Also, the pressure sensor of the touch input device 1000 shown in FIGS. 3a to 3f may be composed of at least one of the first electrode 620 and the second electrode 621. Specifically, when the pressure is applied to the touch surface, the distance between the pressure sensor and the reference potential layer (not shown) which is spaced from the pressure sensor and is placed on, under or within the display panel 200A is changed. Due to the distance change between the pressure sensor and the reference potential layer, the capacitance between the first electrode 620 and the reference potential layer, that is to say, the self-capacitance of the first electrode 620 and/or the capacitance between the second electrode 621 and the reference potential layer, that is to say, the self-capacitance of the second electrode 621 may change. As such, the touch pressure can be detected according to the self-capacitance of the first electrode 620 and/or the second electrode 621. Here, when the electrode used to drive the display panel 200A includes at least one of the first electrode 620 and the second electrode 621, the touch pressure can be detected simultaneously with driving the display panel 200A. Also, the display panel 200A may be driven in the first time interval and the touch pressure may be detected in the second time interval different from the first time interval. Here, when the touch sensor 10 includes at least one of the first electrode 620 and the second electrode 621, it is possible to detect the touch position and simultaneously to detect the touch pressure. Also, the touch position may be detected in the first time interval, and the touch pressure may be detected in the second time interval different from the first time interval. Here, when the touch sensor 10 includes at least one of the first electrode 620 and the second electrode 621 and the electrode used to drive the display panel 200A includes at least one of the first electrode 620 and the second electrode 621, the touch position and the touch pressure can be detected simultaneously with driving the display panel 200A. Further, the touch position may be detected in the first time interval, the touch pressure may be detected in the second time interval different from the first time interval, and the display panel 200A may be driven in the third time interval different from the first time interval and the second time interval.

Here, the reference potential layer may be disposed on the display panel 200A.

Specifically, the reference potential layer may be disposed between the display panel 200A and the cover layer which is disposed on the display panel 200A and functions to protect the display panel 200A. More specifically, the reference potential layer may be formed on the bottom surface of the cover layer. Further, the distance between the reference potential layer and the pressure sensor should be changeable at the time of applying the pressure to the touch input device 1000. Therefore, a spacer layer may be disposed between the reference potential layer and the pressure sensor. When the pressure sensor does not include the first electrode 620 or the second electrode 621 in the touch input device 1000 shown in FIGS. 3a and 3d, the reference potential layer may be disposed between the pressure sensor and the display panel 200A or disposed on the pressure sensor.

According to the embodiment, the spacer layer may be implemented by an air gap. According to the embodiment, the spacer layer may be made of an impact absorbing material. According to the embodiment, the spacer layer may be filled with a dielectric material. According to the embodiment, the spacer layer may be made of a material having a restoring force by which the material contracts by applying the pressure and returns to its original shape by releasing the pressure. According to the embodiment, the spacer layer may be made of an elastic foam. Also, since the spacer layer is disposed on the display panel 200A, the spacer layer may be made of a transparent material.

Further, the reference potential layer may be disposed under the display panel 200A. Specifically, the reference potential layer may be formed on a below-described substrate disposed under the display panel 200A, or alternatively, the substrate itself may serve as the reference potential layer. Also, the reference potential layer may be disposed on the substrate and under the display panel 200A. The reference potential layer may be formed on the cover which functions to protect the display panel 200A, or alternatively the cover itself may serve as the reference potential layer. When the pressure is applied to the touch input device 1000, the display panel 200A is bent. Due to the bending of the display panel 200A, the distance between the reference potential layer and the pressure sensor may be changed. Also, the spacer layer may be disposed between the reference potential layer and the pressure sensing unit 400. Specifically, the spacer layer may be disposed between the display panel 200A and the substrate where the reference potential layer has been disposed or between the display panel 200A and the cover where the reference potential layer has been disposed. Also, when the pressure sensor does not include the first electrode 620 or the second electrode 621 in the touch input device 1000 shown in FIGS. 3a and 3d, the spacer layer may be disposed on the display panel 200A.

Likewise, according to the embodiment, the spacer layer may be implemented by the air gap. According to the embodiment, the spacer layer may be made of an impact absorbing material. According to the embodiment, the spacer layer may be filled with a dielectric material. According to the embodiment, the spacer layer may be made of a material having a restoring force by which the material contracts by applying the pressure and returns to its original shape by releasing the pressure. According to the embodiment, the spacer layer may be made of an elastic foam. Also, since the spacer layer is disposed under the display panel 200A, the spacer layer may be made of a transparent material or an opaque material.

Also, the reference potential layer may be disposed within the display panel 200A. Specifically, the reference potential layer may be disposed on the top surface or bottom surface of the first substrate layers 261 and 281 of the display panel 200A or may be disposed on the top surface or bottom surface of the second substrate layers 262 and 283. More specifically, the reference potential layer may include at least one of the first electrode 620 and the second electrode 621. When the pressure is applied to the touch input device 1000, the display panel 200A is bent. Due to the bending of the display panel 200A, the distance between the reference potential layer and the pressure sensor may be changed. Also, the spacer layer may be disposed between the reference potential layer and the pressure sensor. When the pressure sensor does not include the first electrode 620 or the second electrode 621 in the touch input device 1000 shown in FIGS. 3a and 3d, the spacer layer may be disposed on or within the display panel 200A. In the case of the touch input device shown in FIGS. 3b, 3c, 3e, and 3f, the space layer may be disposed within the display panel 200A.

Likewise, according to the embodiment, the spacer layer may be implemented by the air gap. According to the embodiment, the spacer layer may be made of an impact absorbing material. According to the embodiment, the spacer layer may be filled with a dielectric material. According to the embodiment, the spacer layer may be made of a material having a restoring force by which the material contracts by applying the pressure and returns to its original shape by releasing the pressure. According to the embodiment, the spacer layer may be made of an elastic foam. Also, since the spacer layer is disposed on or inside the display panel 200A, the spacer layer may be made of a transparent material.

According to the embodiment, when the spacer layer is disposed within the display panel 200A, the spacer layer may be the air gap which is included during the manufacture of the display panel 200A and/or a backlight unit. When the display panel 200A and/or the backlight unit includes one air gap, the one air gap may function as the spacer layer. When the display panel 200A and/or the backlight unit includes a plurality of the air gaps, the plurality of air gaps may collectively function as the spacer layer.

When the touch sensor 10 and/or the pressure sensor include the first electrode 620 or the second electrode 621 and the display panel 200A is the LCD panel, at least one of a data line, a gate line, a common electrode, and a pixel electrode may be used as the touch sensor 10 and/or the pressure sensor. Also, when the display panel 200A is the OLED panel, at least one of a gate line, a data line, a first power line (ELVDD), and a second power line (ELVSS) may be used as the touch sensor 10 and/or the pressure sensor. In addition, according to the embodiment, at least one of the electrodes included in the display other than the electrodes described herein may be used as the touch sensor 10 and/or the pressure sensor.

The foregoing has described the touch input device detecting the touch pressure by using the electrode used to detect the touch position and/or the electrode used to drive the display. Hereinafter, the following detailed description will be provided by taking an example of a case where a separate electrode other than the electrode used to detect the touch position and the electrode used to drive the display is disposed in order to detect the touch pressure in the touch input device according to the embodiment of the present invention.

In the touch input device 1000 according to the embodiment of the present invention, the pressure sensors 450 and 460 for detecting the capacitance change amount is formed in the form of an electrode sheet and may be attached to the touch input device 1000 including the display module 200 and the substrate 300. The display module 200 of the touch input device 1000 according to the embodiment of the present invention may include the display panel 200A and a configuration for driving the display panel 200A. Specifically, when the display panel 200A is the LCD panel, the display module 200 may include the LCD panel and the backlight unit (not shown) and may further include a display panel control IC for operation of the LCD panel, a graphic control IC, and other circuits.

FIGS. 4a to 4f show an example in which the electrode sheet according to the embodiment of the present invention is applied to the touch input device.

In the touch input device 1000 according to the embodiment of the present invention, by means of an adhesive like an optically clear adhesive (OCA), lamination may occur between the display module 200 and the cover layer 100 on which the touch sensor for detecting the touch position has been formed. As a result, the display color clarity, visibility and optical transmittance of the display module 200, which can be recognized through the touch surface of the touch sensor, can be improved.

In the description with reference to FIGS. 4a to 4f, it is shown that, in the touch input device 1000 according to the embodiment of the present invention, the cover layer 100 in which the touch sensor has been formed is, as shown in FIGS. 3a and 3d, laminated on and attached to the display module 200 by means of an adhesive. However, the touch input device 1000 according to the embodiment of the present invention may include that the touch sensor 10 is, as shown in FIGS. 3b and 3e, disposed within the display module 200. More specifically, while FIGS. 4a and 4b show that the cover layer 100 where the touch sensor 10 has been formed covers the display module 200, the touch input device 1000 which includes the touch sensor 10 disposed within the display module 200 and includes the display module 200 covered with the cover layer 100 like glass may be used as the embodiment of the present invention.

The touch input device 1000 to which the electrode sheet may be applied according to the embodiment of the present invention may include an electronic device including the touch screen, for example, a cell phone, a personal data assistant (PDA), a smart phone, a tablet personal computer, an MP3 player, a laptop computer, etc.

In the touch input device 1000 to which the electrode sheet may be applied according to the embodiment of the present invention, the substrate 300, together with an outermost housing 320 of the touch input device 1000, may function to surround a mounting space 310, etc., where the circuit board and/or battery for operation of the touch input device 1000 are placed. Here, the circuit board for operation of the touch input device 1000 may be a main board. A central processing unit (CPU), an application processor (AP) or the like may be mounted on the circuit board. Due to the substrate 300, the display module 200 is separated from the circuit board and/or battery for operation of the touch input device 1000. Due to the substrate 300, electrical noise generated from the display module 200 can be blocked.

In the touch input device 1000, the touch sensor 10 or the cover layer 100 may be formed wider than the display module 200, the substrate 300, and the mounting space 310. As a result, the housing 320 may be formed such that the housing 320, together with the touch sensor 10, surrounds the display module 200, the substrate 300, and the circuit board.

The touch input device 1000 according to the embodiment of the present invention may detect the touch position through the touch sensor 10 and may detect the touch pressure by placing the electrode sheet 440 between the display module 200 and the substrate 300. Here, the touch sensor 10 may be disposed within or outside the display module 200.

Hereinafter, the components which are for detecting the pressure and include the electrode sheet 440 are collectively referred to as the pressure detection module 400. For example, in the embodiment, the pressure detection module 400 may include the electrode sheet 440 and/or the space layer 420.

As described above, the touch detection module 400 is formed to include, for example, the spacer layer 420 composed of the air gap. This will be described in detail with reference to FIGS. 4b to 4f. According to the embodiment, the spacer layer 420 may be made of an impact absorbing material. According to the embodiment, the spacer layer 420 may be filled with a dielectric material.

FIG. 4b is a perspective view of the touch input device 1000 according to the embodiment of the present invention. As shown in FIG. 4b, in a first example of the present invention, the electrode sheet 440 may be disposed between the display module 200 and the substrate 300 in the touch input device 1000. Here, the touch input device 1000 may include the spacer layer disposed between the display module 200 and the substrate 300 of the touch input device 1000 in order to dispose the electrode sheet 440.

Hereinafter, for the purpose of clearly distinguishing the electrodes 450 and 460 from the electrode included in the touch sensor 10, the electrodes 450 and 460 for detecting the pressure are designated as the pressure sensors 450 and 460. Here, since the pressure sensors 450 and 460 are disposed in the rear side instead of in the front side of the display panel, the pressure sensor 450 and 460 may be made of an opaque material as well as a transparent material.

Here, a frame 330 having a predetermined height may be formed along the border of the upper portion of the substrate 300 in order to maintain the spacer layer 420 in which the electrode sheet 440 is disposed. Here, the frame 330 may be bonded to the cover layer 100 by means of an adhesive tape (not shown). While FIG. 4b shows the frame 330 is formed on the entire border (e.g., four sides of the quadrangle) of the substrate 300, the frame 330 may be formed only on at least some (e.g., three sides of the quadrangle) of the border of the substrate 300. According to the embodiment, the frame 330 may be formed on the top surface of the substrate 300 may be integrally formed with the substrate 300 on the top surface of the substrate 300. In the embodiment of the present invention, the frame 330 may be made of an inelastic material. In the embodiment of the present invention, when a pressure is applied to the display module 200 through the cover layer 100, the display module 200, together with the cover layer 100, may be bent. Therefore, the magnitude of the touch pressure can be detected even though the frame 330 is not deformed by the pressure.

FIG. 4c is a cross sectional view of the touch input device including the pressure sensor of the electrode sheet according to the embodiment of the present invention. While FIG. 4c and the following figures show that the pressure sensors 450 and 460 are separated from the electrode sheet 440, this is just for convenience of description. The pressure sensors 450 and 460 may be included in the electrode sheet 440. As shown in FIG. 4c, the electrode sheet 440 including the pressure sensors 450 and 460 according to the embodiment of the present invention may be disposed within the spacer layer 420 and on the substrate 300.

The pressure sensor for detecting the pressure may include the first electrode 450 and the second electrode 460. Here, any one of the first electrode 450 and the second electrode 460 may be a drive electrode, and the other may be a receiving electrode. A drive signal is applied to the drive electrode, and a sensing signal may be obtained through the receiving electrode. When a voltage is applied, a mutual capacitance may be generated between the first electrode 450 and the second electrode 460.

FIG. 4d is a cross sectional view when a pressure is applied to the touch input device 1000 shown in FIG. 4c. The bottom surface of the display module 200 may have a ground potential for shielding the noise. When a pressure is applied to the surface of the cover layer 100 by the object 500, the cover layer 100 and the display module 200 may be bent or pressed. As a result, a distance "d" between the ground potential surface and the pressure sensors 450 and 460 may be decreased to "d'". In this case, due to the decrease of the distance "d", the fringing capacitance is absorbed in the bottom surface of the display module 200, so that the mutual capacitance between the first pressure electrode 450 and the second pressure electrode 460 may be reduced. Therefore, the magnitude of the touch pressure can be calculated by obtaining the reduction amount of the mutual capacitance from the sensing signal obtained through the receiving electrode.

Although it has been described in FIG. 4d that the bottom surface of the display module 200 has the ground potential, that is to say, is the reference potential layer, the reference potential layer may be disposed within the display module 200. Here, when a pressure is applied to the surface of the cover layer 100 by the object 500, the cover layer 100 and the display module 200 may be bent or pressed. As a result, a distance between the pressure sensors 450 and 460 and the reference potential layer disposed inside the display module 200 is changed. Therefore, the magnitude of the touch pressure can be calculated by obtaining the capacitance change amount from the sensing signal obtained through the receiving electrode.

In the touch input device 1000 to which the electrode sheet 440 is applied according to the embodiment of the present invention, the display module 200 may be bent or pressed by the touch applying the pressure. The display module 200 may be bent or pressed to show deformation by the touch. When the display module 200 is bent or pressed according to the embodiment, a position showing the biggest transformation may not match the touch position. However, the display module 200 may be shown to be bent at least at the touch position. For example, when the touch position approaches close to the border, edge, etc., of the display module 200, the most bent or pressed position of the display module 200 may not match the touch position, however, the display module 200 may be shown to be bent or pressed at least at the touch position.

Here, the top surface of the substrate 300 may also have the ground potential for shielding the noise. FIG. 5 shows a cross section of the electrode sheet according to the embodiment of the present invention. Referring to (a) of FIG. 5, the cross sectional view shows that the electrode sheet 440 including the pressure sensors 450 and 460 has been attached to the substrate 300 or the display module 200. Here, short-circuit can be prevented from occurring between the pressure electrodes 450 and 460 and either the substrate 300 or the display module 200 because the pressure sensors 450 and 460 are disposed between a first insulation layer 470 and a second insulation layer 471 in the electrode sheet 440. Depending on the type and/or implementation method of the touch input device 1000, the substrate 300 or the display module 200 to which the pressure sensors 450 and 460 are attached may not have the ground potential or may have a weak ground potential. In this case, the touch input device 1000 according to the embodiment of the present invention may further include a ground electrode (not shown) between the insulation layer 470 and either the substrate 300 or the display module 200. According to the embodiment of the present invention, the touch input device 1000 may further include another insulation layer (not shown) between the ground electrode and either the substrate 300 or the display module 200. Here, the ground electrode (not shown) is able to prevent the size of the capacitance generated between the first electrode 450 and the second electrode 460, which are pressure sensors, from increasing excessively.

An example is shown in FIG. 4e where the electrode sheet 440 including the pressure sensors 450 and 460 according to the embodiment of the present invention is formed on the bottom surface of the display module 200. Here, the substrate 300 may have the ground potential. Therefore, the distance "d" between the substrate 300 and the pressure sensors 450 and 460 is decreased by touching the touch surface of the cover layer 100. As a result, the change of the mutual capacitance between the first electrode 450 and the second electrode 460 may be caused.

In the state where the first electrode 450 and the second electrode 460 are formed in the same layer, each of the first electrode 450 and the second electrode 460 shown in FIG. 5 may be, as shown in FIG. 7a, composed of a plurality of lozenge-shaped electrodes. Here, the plurality of the first electrodes 450 are connected to each other in the first axial direction, and the plurality of the second electrodes 460 are connected to each other in the second axial direction orthogonal to the first axial direction. The lozenge-shaped electrodes of at least one of the first electrode 450 and the second electrode 460 are connected to each other through a bridge, so that the first electrode 450 and the second electrode 460 may be insulated from each other. Also, here, the first electrode 450 and the second electrode 460 shown in FIG. 5 may be composed of an electrode having a form shown in FIG. 7b.

It is possible to consider that the first electrode 450 and the second electrode 460 are formed in different layers in accordance with the embodiment of the present invention so that an electrode layer is formed. In (b) of FIG. 5, the cross sectional view shows that the first electrode 450 and the second electrode 460 are formed in different layers. As shown in (b) of FIG. 5, the first electrode 450 may be formed on the first insulation layer 470, and the second electrode 460 may be formed on the second insulation layer 471 located on the first electrode 450. According to the embodiment of the present invention, the second electrode 460 may be covered with a third insulation layer 472. In other words, the electrode sheet 440 may include the first to third insulation layers 470 to 472, the first electrode 450, and the second electrode 460. Here, the first electrode 450 and the second electrode 460 may be implemented so as to overlap each other because they are disposed in different layers. For example, the first electrode 450 and the second electrode 460 may be, as shown in FIG. 7c, formed similarly to the pattern of the drive electrode TX and receiving electrode RX which are arranged in the form of M×N array. Here, M and N may be natural numbers greater than 1. Also, as shown in FIG. 7a, the lozenge-shaped first electrode 450 and the lozenge-shaped second electrode 460 may be located in different layers respectively.

In the foregoing, it is shown that the touch pressure is detected from the change of the mutual capacitance between the first electrode 450 and the second electrode 460. However, the electrode sheet may be configured to include only one electrode of the first electrode 450 and the second electrode 460. In this case, it is possible to detect the magnitude of the touch pressure by detecting the change of the capacitance between the one pressure sensor and a ground layer (the display module 200, the substrate 300, or the reference potential layer disposed within the display module 200), that is to say, the change of the self-capacitance. Here, the drive signal is applied to the one pressure sensor, and the change of the self-capacitance between the pressure sensor and the ground layer can be detected by the pressure sensor.

For instance, in FIG. 4c, the pressure sensor included in the electrode sheet 440 may be configured to include only the first electrode 450. Here, the magnitude of the touch pressure can be detected by the change of the capacitance between the first electrode 450 and the display module 200, which is caused by a distance change between the display module 200 and the first electrode 450. Since the distance "d" is reduced with the increase of the touch pressure, the capacitance between the display module 200 and the first electrode 450 may be increased with the increase of the touch pressure. This can be applied in the same manner to the embodiment related to FIG. 4e. Here, the pressure sensor should not necessary have a comb teeth shape or a trident shape, which is required to improve the detection accuracy of the mutual capacitance change amount. One of the first electrode 450 and the second electrode 460 may have a plate shape (e.g., quadrangular plate), and the other may have, as shown in FIG. 7d, a shape in which the electrodes are disposed at a regular interval in the form of a grid.

In (c) of FIG. 5, the cross sectional view shows that the electrode sheet 440 is implemented to include only the first electrode 450. As shown in (c) of FIG. 5, the electrode sheet 440 including the first electrode 450 may be disposed on the substrate 300 or the display module 200.

FIG. 4f shows that the pressure sensors 450 and 460 are formed within the spacer layer 420 and on the top surface of the substrate 300 and on the bottom surface of the display module 200. The electrode sheet may be composed of a first electrode sheet 440-1 including the first electrode 450 and a second electrode sheet 440-2 including the second electrode 460. Here, one of the first electrode 450 and the second electrode 460 may be formed on the substrate 300 and the other may be formed on the bottom surface of the display module 200. FIG. 4f shows that the first electrode 450 is formed on the substrate 300 and the second electrode 460 is formed on the bottom surface of the display module 200.

When the pressure is applied to the surface of the cover layer 100 by the object 500, the cover layer 100 and the display module 200 may be bent or pressed. As a result, the distance "d" between the first electrode 450 and the second electrode 460 may be decreased. In this case, the mutual capacitance between the first electrode 450 and the second electrode 460 may be increased with the reduction of the distance "d". Therefore, the magnitude of the touch pressure can be calculated by obtaining the increase amount of the mutual capacitance from the sensing signal obtained through the receiving electrode. Here, in FIG. 4f, since the first electrode 450 and the second electrode 460 are formed in different layers, the first electrode 450 and the second electrode 460 should not necessary have a comb teeth shape or a trident shape. The first electrode 450 and the second electrode 460 may have a plate shape (e.g., quadrangular plate) respectively, or alternatively the plurality of the first electrodes 450 and the plurality of the second electrodes 460 may be, as shown in FIG. 7d, disposed at a regular interval in the form of a grid.

In (d) of FIG. 5, the cross sectional view shows that the first electrode sheet 440-1 including the first electrode 450 is attached to the substrate 300, and the second electrode sheet 440-2 including the second electrode 460 is attached to the display module 200. As shown in (d) of FIG. 5, the first electrode sheet 440-1 including the first electrode 450 may be disposed on the substrate 300. Also, the second electrode sheet 440-2 including the second electrode 460 may be disposed on the bottom surface of the display module 200.

As with the description related to (a) of FIG. 5, when the substrate 300 or the display module 200 to which the pressure sensors 450 and 460 are attached may not have the ground potential or may have a weak ground potential, the electrode sheet 440 in (a) to (d) of FIG. 5 may further include a ground electrode (not shown) between the first insulation layers 470, 470-1, and 470-2 and either the substrate 300 or the display module 200. Here, the electrode sheet 440 may further include an additional insulation layer (not shown) between the ground electrode (not shown) and either the substrate 300 or the display module 200.

In the touch input device 1000 according to the embodiment of the present invention, the pressure sensors 450 and 460 for detecting the capacitance change amount may be directly formed on the display panel 200A. FIGS. 6a to 6c are cross sectional views showing the embodiments of the pressure sensor 450 and 460 formed directly on various display panel 200A.

First, FIG. 6a shows the pressure sensors 450 and 460 formed on the display panel 200A using the LCD panel. Specifically, as shown in FIG. 6a, the pressure sensors 450 and 460 may be formed on the bottom surface of the second substrate layer 262. Here, while the second polarization layer 272 is omitted in FIG. 6a, the second polarization layer 272 may be disposed between the backlight unit 275 and the pressure sensors 450 and 460 or between the second substrate layer 262 and the pressure electrodes 450 and 460. In detecting the touch pressure on the basis of the mutual capacitance change amount when the pressure is applied to the touch input device 1000, a drive signal is applied to the drive electrode 450, and an electrical signal including information on the capacitance which is changed by the distance change between the pressure sensors 450 and 460 and the reference potential layer 300 separated from the pressure sensors 450 and 460 is received from the receiving electrode 460. When the touch pressure is detected on the basis of the self-capacitance change amount, a drive signal is applied to the pressure sensors 450 and 460, and an electrical signal including information on the capacitance which is changed by the distance change between the pressure sensors 450 and 460 and the reference potential layer separated from the pressure sensors 450 and 460 is received from the pressure sensors 450 and 460.

Next, FIG. 6b shows the pressure sensors 450 and 460 formed on the bottom surface of the display panel 200A using the OLED panel (in particular, AM-OLED panel).

Specifically, the pressure sensors 450 and 460 may be formed on the bottom surface of the second substrate layer 283. Here, a method for detecting the pressure is the same as that described in FIG. 6a.

Next, FIG. 6c shows the pressure sensors 450 and 460 formed within the display panel 200A using the OLED panel. Specifically, the pressure sensors 450 and 460 may be formed on the top surface of the second substrate layer 283. Here, a method for detecting the pressure is the same as that described in FIG. 6a.

Also, although the display panel 200A using the OLED panel has been described by taking an example thereof with reference to FIG. 6c, it is possible that the pressure sensors 450 and 460 are formed on the top surface of the second substrate layer 272 of the display panel 200A using the LCD panel.

Also, although it has been described in FIGS. 6a to 6c that the pressure sensors 450 and 460 are formed on the top surfaces or bottom surfaces of the second substrate layers 262 and 283, it is possible that the pressure sensors 450 and 460 are formed on the top surfaces or bottom surfaces of the first substrate layers 261 and 281.

In the touch input device 1000 according to the embodiment of the present invention, the pressure sensors 450 and 460 for detecting the capacitance change amount may be composed of the first electrode 450 directly formed on the display panel 200A and the second electrode 460 formed in the form of an electrode sheet. Specifically, the first electrode 450 may be, as shown in FIGS. 6a to 6c, directly formed on the display panel 200A, and the second electrode 460 may be, as described in FIGS. 4 to 5, formed in the form of an electrode sheet and may be attached to the touch input device 1000.

Up to now, the hardware components of the touch input device according to the embodiment of the present invention have been described. Hereinafter, a touch input method according to the embodiment of the present invention will be described.

FIG. 8 is a flowchart of a touch input method according to the embodiment of the present invention.

As shown in FIG. 8, according to the touch input method based on the embodiment of the present invention, the processor 1500 may arrange at least one icon on the touch screen 1001. According to the embodiment of the present invention, the icon may be set to be automatically arranged when the power is turned on (S801).

The touch screen 1001 according to the embodiment of the present invention may include at least one region. The processor 1500 may determine whether to receive first touch information on the first region included in the at least one region (S802).

While the first region according to the embodiment of the present invention may be a region for receiving the touch input and performing operations corresponding to the touch input, a below-described second region is different from the first region and may be a remaining region other than the first region. Also, at least one of the first region and the second region according to the embodiment of the present invention may have a predetermined icon.

For example, as shown in FIG. 9*a*, the first region 91 may receive a user finger touch input and perform an operation corresponding to the finger touch input. Here, the first region 91 may include a predetermined icon "A".

While FIG. 9*a* shows that the first region 91 includes one icon, the first region 91 may include a plurality of icons in accordance with the embodiment of the present invention. The second region 92 may also include one or a plurality of icons.

In the meantime, in a case where the first region 91 includes the icon "A", though a portion of the icon "A" is touched when the processor 1500 senses the touch input of the user, the processor 1500 may recognize as if it has received the first touch information on the first region.

For example, as shown in FIG. 9*b*, the first region 91 may include a portion (a) located within the border of the icon "A", a portion (b) adjacent to both sides of the border of the icon "A", and a threshold portion (c) for sensing as the touch input on the icon "A". Specifically, the portion (a) may include the central portion of the icon "A", the portion (b) may be adjacent to both sides of the border of the icon "A" and be spaced apart by a predetermined distance, and the portion (c) may be a threshold portion which is for not recognizing as the touch input on the second region 92.

When each of these portions (a), (b), and (c) of the first region 91 receives the touch input, operations corresponding to the touch input on the icon "A" can be performed.

According to another embodiment of the present invention, the processor 1500 may control such that different operations can be performed according to the touch input to each of the portions (a), (b), and (c). For example, when the touch is input to the portion (a), the processor 1500 may control to perform an operation corresponding to the touch input to the first region 91, and when the touch is input to the portion (b) or the portion (c), the processor 1500 may control to perform an operation corresponding to the touch input to the second region 92.

If the touch is input to a region that is not desired by the user, that is to say, a region other than the portions (a), (b), and (c), an error message shown in (b) of FIG. 9*e* may be displayed.

The first touch information and/or second touch information according to the embodiment of the present invention may include at least one of pressure, area, time information. The embodiment of the present invention has described the pressure as the main example of the first touch information and/or second touch information. Here, the area and time can be applied as the example of the first touch information and/or second touch information in the same/similar manner.

Meanwhile, the first touch information may include first pressure touch information on applied pressure having a magnitude greater than a predetermined magnitude, and the below-described second touch information may also include second pressure touch information on applied pressure having a magnitude greater than a predetermined magnitude. The second pressure touch information may be pressure information on pressure having a magnitude greater than the pressure magnitude of the first pressure touch information. For example, magnitude information of the first pressure shown in FIG. 10, which reaches after a predetermined time (t1) elapses may be defined as the first pressure touch information, and magnitude information of the second pressure which reaches after a predetermined time (t2) elapses may be defined as the second pressure touch information. Here, the second pressure touch information may be set as pressure information on pressure having a magnitude greater than the pressure magnitude of the first pressure touch information.

According to the embodiment of the present invention, FIG. 10 shows general touch information (tab touch or long touch) (a) before reaching the magnitude information of the first pressure, the first pressure touch information (b) which reaches the magnitude information of the first pressure and has a pressure magnitude that is greater than the magnitude of the first pressure and smaller than the magnitude of the second pressure, the second pressure touch information (c) which has a magnitude equal to or greater than the magnitude of the second pressure.

The second pressure touch information of the embodiment of the present invention is the pressure information on pressure having a magnitude greater than the pressure magnitude of the first pressure touch information and may be pressure touch information for performing a predetermined icon. The processor 1500 may perform the predetermined icon when receiving the second pressure touch information. When, for a predetermined period of time (t1 to t2), the first pressure touch information (b) of which the pressure magnitude is greater than the magnitude of the first pressure and is smaller than the magnitude information of the second pressure is continuously input, the processor 1500 may control the such that the state of the touch screen 1001 is changed again from the state where the state information of the first region 91 has been changed to the state where initial icons have been arranged. That is to say, the state (b) of FIG. 9*a* may be changed again to the state (a).

While the foregoing has taken the first pressure touch information and/or the second pressure touch information as the example of the first touch information and/or the second touch information, a case where a touch area (or time) is changed with the touch pressure maintained the same can be also applied as the example of the first touch information and/or second touch information in the same/similar manner. That is to say, when any touch input operation is performed by using a touch object (e.g., a pen) the shape of which is not changed, the touch area (or time) is enlarged/increased or reduced/decreased with the magnitude of the touch pressure maintained the same, so that it is possible to control such that the state information of the icon is changed and/or a command corresponding to the icon is executed. For example, it is possible to control such that the state information of the icon is changed by first time touch information and a command corresponding to the icon is executed by second time touch information. Here, the second time touch information may be information on time further increased than that of the first time touch information.

The present specification has mainly described that the first or second touch information includes the first or second pressure touch information. However, the embodiment of the present invention is not limited to this. The first or second touch information may include the number of touch vibrations, etc. For example, the first touch information may include a piece of singular vibration information, and the second touch information may include a plurality of vibration information.

Subsequently, when the processor 1500 determines to receive the first touch information on the first region included in at least one region, the processor 1500 may control such that the state information of the icon included in the first region or the state information of the icon included in the second region different from the first region is changed (S803 to S805). Here, setting information on whether to change the state information of the icon included in the first region may be stored in the memory 1005. Based on the setting information, the processor 1500 may control such that the state information of the icon included in the first region or in the second region is automatically changed.

The embodiment of the present invention has described that the state information of the icon included in the first region or the state information of the icon included in the second region can be selectively changed. However, according to another embodiment of the present invention, the state information of the icon included in the first region or the state information of the icon included in the second region can be also changed together/at the same time. For example, when the first touch information is received, the arrangement state of the icons included in the second region 92 of FIG. 9d may be changed as the icon included in the first region 91 of FIG. 9a is enlarged.

Also, the touch screen 1001 of the embodiment of the present invention may include one or more windows. The processor 1500 may set such that the state information of the icon included in the first region or the state information of the icon included in the second region is changed differently for each window. This setting information may be stored in the memory 1005.

For example, as shown in FIG. 11, the touch screen 1001 according to the embodiment of the present invention may include four divided windows (a) to (d). The state information of the first window (a) may be set to be different from the state information of the second window (b). In other words, the first window (a) may cause the state information of the icon included in the first region which is for receiving the touch input and performing the operation corresponding to the touch input to be changed, and the second window (b) may cause the state information of the icon included in the second region other than the first region in the touch screen 1001 to be changed.

While the first region may receive the touch input and perform the operation corresponding to the touch input, the below-described second region is different from the first region and may be a remaining region other than the first region on the touch screen 1001.

As described above, the first region or the second region of the touch screen 1001 according to the embodiment of the present invention may include a predetermined icon. The processor 1500 may control such that the state information of the icon included in the first region or in the second region is changed by changing at least one of the number, size, transparency, color, shape, or arrangement of the predetermined icons.

The processor 1500 according to the embodiment of the present invention may control such that the size of the icon is changed in the first region which has received the first touch information and the arrangement of the icons is changed in the second region.

For example, as shown in FIG. 9a, the processor 1500 may control such that the size of the icon is changed in the first region 91 which has received the first touch information. In the embodiment of the present invention, while the size of the icon is controlled to be enlarged in the first region 91, the size of the icon may be controlled to be reduced in the first region 91 in accordance with the implementation thereof. Besides, as shown in FIG. 9c, the shape of the icon included in the first region or in the second region may be controlled to be changed.

According to the embodiment of the present invention, as the size of the icon is controlled to be changed, the size of the touch icon that is desired by the user is changed, so that it is possible to make it easier to operate the icons in performing the icons.

Also, for example, as shown in FIG. 9d, the processor 1500 may control such that the arrangement of the icons is changed in the second region 92 different from the first touch region 91 even though the processor 1500 determines to receive the first touch information on the first region. The second region 92 is different from the first region 91 and may be a remaining region other than the first region 91 on the touch screen 1001. That is, as shown in FIG. 9d, the plurality of icons included in the second region 92 may be displayed such that they are distributed in a direction further away from the icon "A" included in the first region 91. Here, the processor 1500 may control such that the plurality of icons included in the second region 92 are distributed at the same speed or at different speeds respectively.

According to the embodiment of the present invention, the number of the icons is determined in advance according to the size of the icon on the touch screen 1001. Corresponding contents may be stored in the memory 1005. Here, the number of the icons in the first region 91 may be previously set to be different from the number of the icons in the second region 92.

Meanwhile, the processor 1500 may determine whether the touch input is maintained or not, after changing the state information of the icon included in the first region or in the second region (S806).

If it is determined that the touch input is maintained, the processor 1500 may control such that the second touch information on the first region is further received (S807). Here, after a predetermined period of time elapses, the second touch information on the first region may be further received. The second touch information may be the second pressure touch information and may be the pressure information on pressure having a magnitude greater than the pressure magnitude of the first pressure touch information. The processor 1500 which has received the second touch information may receive the second pressure touch information in the state (c) shown in FIG. 10 and control such that the corresponding icon included in the first region shown in FIG. 9a is performed (S808).

Conversely, if it is determined that the touch input is released, the processor 1500 may terminate the corresponding process in accordance with the embodiment of the present invention.

While the foregoing has described the embodiment in which the capacitive pressure sensor is used to detect the touch pressure in accordance with the embodiment of the present invention, the following description will focus on an embodiment in which the pressure sensor using a resistance change (e.g., strain gauge) is used in order to detect the touch pressure or force.

As an embodiment, the touch input device according to the embodiment of the present invention may include the display panel 200A in which the pressure sensor for detecting the pressure is formed and may detect the touch force on the basis of the change of the resistance value of the pressure sensor.

FIG. 12a is a cross sectional view of the touch input device including the pressure sensor according to the embodiment of the present invention. As shown in FIG. 12a, the pressure sensor 450 according to the embodiment of the present invention may be formed on the bottom surface of the display panel 200A.

FIG. 12b is a cross sectional view when a force is applied to the touch input device 1000 shown in FIG. 12a. The top surface of the substrate 300 may have a ground potential so as to block the noise. When a force is applied to the surface of the cover layer 100 by an object 500, the cover layer 100 and the display panel 200A may be bent or pressed. Due to the bending of the display panel 200A, the pressure sensor 450 formed on the display panel 200A is deformed. Accordingly, the resistance value of the pressure sensor 450 may be changed. The magnitude of the touch force can be calculated by the change of the resistance value.

In the touch input device 1000 according to the embodiment of the present invention, the display panel 200A may be bent or pressed by the touch applying the force. The display panel 200A may be bent or pressed to show deformation by the touch. When the display panel 200A is bent or pressed according to the embodiment, a position showing the biggest deformation may not match the touch position. However, the display panel 200A may be shown to be bent at least at the touch position. For example, when the touch position approaches close to the border, edge, etc., of the display panel 200A, the most bent or pressed position of the display panel 200A may not match the touch position, however, the display panel 200A may be shown to be bent or pressed at least at the touch position.

FIGS. 13a to 13e are plan views showing an exemplary force sensor capable of sensing a force used in the touch input device according to the embodiment of the present invention. In this case, the force sensor may be the pressure sensor (strain gauge). The electrical resistance of the pressure sensor is changed in proportional to the amount of strain. Typically, a metal-bonded pressure sensor may be used.

A transparent material used for the pressure sensor may include conductive polymer (polyethylenedioxythiophene (PEDOT)), indium tin oxide (ITO), Antimony tin oxide (ATO), carbon nanotubes (CNT), graphene, gallium zinc oxide, indium gallium zinc oxide (IGZO), $SnO_2$, $In_2O_3$, ZnO, $Ga_2O_3$, CdO, other doped metal oxides, piezoresistive element, piezoresistive semiconductor materials, piezoresistive metal material, silver nanowire, platinum nanowire, nickel nanowire, other metallic nanowires, etc. An opaque material used for the strain gauge may include silver ink, copper, nano silver, carbon nanotube (CNT), Constantan alloy, Karma alloys, doped polycrystalline silicon, doped amorphous silicon, doped single crystal silicon, other doped semiconductor materials, etc.

As shown in FIG. 13a, the metal pressure sensor may be composed of metal foils arranged in a grid-like manner. Through the grid-like manner, it is possible to maximize the deformation amount of a metal wire or foil which tends to be deformed in a parallel direction. Here, the vertical grid cross section of the pressure sensor 450 shown in FIG. 13a may be minimized in order to reduce the effects of shear strain and Poisson strain.

In FIG. 13a, while the pressure sensor 450 is at rest, that is to say, is not strained or deformed, the strain gauge 450 may include traces 451 which are disposed close to each other without contacting each other. The pressure sensor may have a normal resistance such as 1.8KΩ±0.1% when it is not strained or no force is applied. A sensitivity for the strain may be represented as a basic parameter of the pressure sensor by a gauge factor (GF). Here, the gauge factor may be defined as a ratio of the change of the electrical resistance to the change of the length (strain) and may be represented as follows by a function of a strain E.

$$GF = \frac{\Delta R/R}{\Delta L/L} = \frac{\Delta R/R}{\varepsilon}$$

Here, ΔR represents the change amount of the pressure sensor resistance, R represents a resistance of an undeformed pressure sensor, and GF represents the gauge factor.

Here, in most cases, in order to measure the small change of the resistance, the pressure sensor is used to establish a bridge including a voltage drive source. FIGS. 13b and 13c show an exemplary pressure sensor which can be applied to the touch input device according to the embodiment of the present invention. As shown in the example of FIG. 13b, the pressure sensor is included in a Wheatstone bridge 3000 having four different resistances (represented as R1, R2, R3, and R4) and may detect the resistance change (to other resistors) of the gauge, which represents the applied force. The bridge 3000 is coupled to a force sensor interface (not shown) and receives the drive signal (voltage $V_{EX}$) from a touch controller (not shown) and then drives the pressure sensor, and, for the signal process, transmits the sensing signal (voltage Vo) representing the applied force to the touch controller. Here, the output voltage (Vo) of the bridge 3000 may be represented as follows.

$$V_0 = \left[\frac{R_3}{R_3 + R_4} - \frac{R_2}{R_1 + R_2}\right] \cdot V_{EX}$$

In the above equation, when R1/R2=R4/R3, the output voltage Vo becomes 0. Under this condition, the bridge 3000 is in a balanced state. Here, the value of any one of the resistances included in the bridge 3000 is changed, a non-zero output voltage Vo is output.

Here, as shown in FIG. 13c, when the pressure sensor 450 is $R_G$ and the $R_G$ is changed, the resistance change of the pressure sensor 450 causes imbalance of the bridge and generates the non-zero output voltage Vo. The normal resistance of the pressure sensor 450 is $R_G$, the resistance change, i.e., R that is induced by the deformation may be represented by $\Delta R = R_G \times GF \times \varepsilon$ through the gauge factor equation. Here, when it is assumed that R1=R2 and R3=$R_G$, the bridge equation may be represented again by a function of the strain E of $V_0/V_{EX}$ as follows.

$$\frac{V_0}{V_{EX}} = \frac{GF \cdot \varepsilon}{4}\left(\frac{1}{1 + GF \cdot \frac{\varepsilon}{2}}\right)$$

Though the bridge of FIG. 13c includes only one pressure sensor 450, even four pressure sensors can be used at positions indicated by R1, R2, R3, and R4 included in the bridge of FIG. 13b. In this case, it can be understood that the resistance changes of the gauges can be used to detect the applied force.

As shown in FIGS. 12a and 12b, when a force is applied to the display panel 200A on which the pressure sensor 450 has been formed, the display panel 200A is bent. Due to the bending of the display panel 200A, the trace 451 is extended and becomes longer and narrower, so that the resistance of the pressure sensor 450 increases. As the applied force increases, the resistance of the pressure sensor 450 may increase in response to the increase of the force. Therefore, when the force sensor controller 1300 detects the increase of the resistance value of the pressure sensor 450, the increase may be interpreted as the force applied to the display panel 200A.

In another embodiment, the bridge 3000 may be integrated with the force sensor controller 1300. In this case, one or more of the resistances R1, R2, and R3 may be replaced with the resistance within the force sensor controller 1300. For example, the resistances R1 and R2 may be replaced with the resistances within the force sensor controller 1300 and the bridge 3000 may be composed of the pressure sensor 450 and the resistance R1. As a result, a space occupied by the bridge 3000 can be reduced.

In the pressure sensor 450 shown in FIG. 13a, the traces 451 are arranged in a horizontal direction. Therefore, the sensitivity for the horizontal deformation is high because the length change of the trace 451 is large with respect to the horizontal deformation. However, the sensitivity for the vertical deformation is low because the length change of the trace 451 is relatively small with respect to the vertical deformation. As shown in FIG. 13d, the pressure sensor 450 may include a plurality of sub-regions, and the arrangement direction of the traces 451 included in the respective sub-regions may be different. As such, the pressure sensor 450 including the traces 451 of which the arrangement directions are different is provided, so that the sensitivity difference of the pressure sensor 450 with respect to the deformation direction can be reduced.

In the touch input device 1000 according to the embodiment of the present invention, one pressure sensor 450 is, as shown in FIGS. 13a and 13d, formed under the display panel 200A, so that the force sensor composed of a single channel can be provided. Also, in the touch input device 1000 according to the embodiment of the present invention, a plurality of the pressure sensors 450 are, as shown in FIG. 13e, formed under the display panel 200A, so that the force sensor composed of a plurality of the channels can be provided. By using such a force sensor composed of the plurality of the channels, the magnitude of each of the plurality of the forces on the plurality of the touches can be simultaneously sensed.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

INDUSTRIAL APPLICABILITY

According to the embodiment of the present invention, it is possible to provide a touch input device including a display module capable of detecting not only a touch position on a touch screen but also a magnitude of touch pressure.

Also, according to the embodiment of the present invention, it is possible is to improve the visibility of the display module by displaying a touch screen as desired by a user, and particularly is to make it easier to operate icons in performing the icons.

The invention claimed is:

1. A touch input device comprising:
 a touch screen; and
 a processor;
 wherein in response to a first touch time information of a touch input to a first region including at least one icon on the touch screen, the processor controls to change a size of the icon included in the first region and controls to change a transparency of at least one icon included in the second region, which is a region other than the first region on the touch screen,
 wherein after the icons included in the first and second regions are changed, in response to a second touch time information of the touch continuously inputted to the first region, the processor controls an operation corresponding to the second touch time information to be executed on the icon included in the first region,
 wherein the first touch time information is information in which the touch is maintained in the first region for a first time after the touch is input to the first region,
 wherein the second touch time information is information in which the touch is maintained in the first region for a second time or longer after the size of the icon included in the first region and the transparency of the at least one icon included in the second region are changed,
 wherein the first region includes a first portion within the border of the icon, and a second portion spaced apart from the border of the icon by a predetermined distance to the inside and the outside of the icon, respectively,
 wherein the processor is configured to:
 control such that the touch input to the first portion corresponds to an operation different from the operation Performed by the touch input to the second portion,
 when the touch is input to the first portion, in response to the first touch time information of the touch input to the first portion of the first region, control to change the size of the icon included in the first region, and control to change a transparency of at least one icon included in the second region,
 when the touch is input to the second portion, in response to a third touch time information of the touch input to the second portion of the first region, control to perform an operation corresponding to the second portion of the first region, and wherein the third touch time information is information in which the touch is maintained in the second portion of the first region for a third time after the touch is input to the second portion of the first region.

2. The touch input device of claim 1,
wherein the processor controls to change a number of the at least one icon included in the second region.

3. The touch input device of claim 1,
wherein the processor controls to change a color of the at least one icon included in the second region.

4. The touch input device of claim 1,
wherein the processor controls to change an arrangement of the at least one icon included in the second region.

5. The touch input device of claim 1,
wherein the processor controls to change a size of the at least one icon included in the second region.

6. The touch input device of claim 1,
wherein the processor controls to change a shape of the at least one icon included in the second region.

7. A touch input method comprising:
changing a size of an icon included in a first region on a touch screen and a transparency of at least one icon included in a second region in response to a first touch time information of a touch input to the first region, wherein the second region is a region other than the first region on the touch screen,
executing an operation corresponding to a second touch time information on the icon included in the first region in response to the second touch time information of the touch continuously inputted to the first region after the icon included in the first and second regions are changed,
wherein the first touch time information is information in which the touch is maintained in the first region for a first time after the touch is input to the first region,
wherein the second touch time information is information in which the touch is maintained in the first region for a second time or longer after the size of the icon included in the first region and the transparency of the at least one icon included in the second region are changed, wherein the first region includes a first portion within the border of the icon, and a second portion spaced apart from the border of the icon by a predetermined distance to the inside and the outside of the icon, respectively, and
controlling such that the touch input to the first portion corresponds to an operation different from the operation Performed by the touch input to the second portion,
wherein the changing is configured to:
when the touch is input to the first portion, in response to the first touch time information of the touch input to the first portion of the first region, changing the size of the icon included in the first region, and changing a transparency of at least one icon included in the second region,
when the touch is input to the second portion, in response to a third touch time information of the touch input to the second portion of the first region, performing an operation corresponding to the second portion of the first region, and
wherein the third touch time information is information in which the touch is maintained in the second portion of the first region for a third time after the touch is input to the second portion of the first region.

8. The touch input method of claim 7,
wherein the icon state changes a number of the at least one icon included in a second region.

9. The touch input method of claim 7,
wherein the icon state changes a color of the at least one icon included in the second region.

10. The touch input method of claim 7,
wherein the icon state changes an arrangement of the at least one icon included in the second region.

11. The touch input method of claim 7,
wherein the icon state changes a size of the at least one icon included in the second region.

12. The touch input method of claim 7,
wherein the icon state changes a shape of the at least one icon included in the second region.

* * * * *